US008167995B2

(12) United States Patent
Wagh

(10) Patent No.: US 8,167,995 B2
(45) Date of Patent: May 1, 2012

(54) INORGANIC PHOSPHATE RESINS AND METHOD FOR THEIR MANUFACTURE

(75) Inventor: Arun S. Wagh, Naperville, IL (US)

(73) Assignee: Latitude 18, Inc., Marco Island, FL (US)

( * ) Notice: Subject to any disclaimer, the term of this patent is extended or adjusted under 35 U.S.C. 154(b) by 435 days.

(21) Appl. No.: 12/482,816

(22) Filed: Jun. 11, 2009

(65) Prior Publication Data
US 2009/0312170 A1 Dec. 17, 2009

Related U.S. Application Data

(60) Provisional application No. 61/060,860, filed on Jun. 12, 2008, provisional application No. 61/104,950, filed on Oct. 13, 2008.

(51) Int. Cl.
C04B 28/34 (2006.01)
C01F 17/00 (2006.01)
C01B 25/26 (2006.01)
C01B 25/32 (2006.01)
C01B 25/34 (2006.01)
C01B 25/37 (2006.01)

(52) U.S. Cl. ........ 106/690; 423/263; 423/305; 423/307; 423/308; 423/309; 423/311; 501/1; 501/152; 501/153

(58) Field of Classification Search ............... 423/263, 423/305, 307, 308, 309, 311; 106/690; 501/1, 501/152, 153
See application file for complete search history.

(56) References Cited

U.S. PATENT DOCUMENTS

| 2,160,700 A | * | 5/1939 | Knox, Jr. .................. 428/402 |
| 2,257,281 A | | 9/1941 | Scholz |
| 2,329,065 A | | 9/1943 | Lum et al. |
| 2,450,952 A | | 10/1948 | Greger |

(Continued)

FOREIGN PATENT DOCUMENTS

EP 0256908 2/1988

(Continued)

OTHER PUBLICATIONS

Laufenberg, Theodore L., et al., "Phosphate-Bonded Ceramic-Wood Composites: R&D Project Overview and Invitation to Participate", Proceedings of Ninth International Coference on Inorganic-Bonded Composite Materials, Oct. 2004, (Continued)

Primary Examiner — Wayne Langel
(74) Attorney, Agent, or Firm — Moore & Van Allen PLLC

(57) ABSTRACT

A method is provided for making inexpensive synthetic inorganic resins that are stable, mix easily with water and may be conveniently diluted to form an easy-to-use paste for commercial applications. The method uses environmentally friendly techniques to provide improved efficiencies in the commercial production of these resins. The resins are produced by the partial reaction of phosphoric acid with sparsely-soluble oxides, or sparsely-soluble oxide minerals, that are added to the phosphoric acid under controlled conditions. In certain specific embodiments, methods are provided for modifying synthetic inorganic resins so as to produce rapid-setting phosphate cements and ceramics having high flexural strength. Unique synthetic inorganic resin formulations are also disclosed. These formulations are phosphate-mineral based, non-volatile, tend to be non-flammable, do not contain any hazardous inorganic or organic compounds, and are chemically stable at relatively high temperatures, yet they are less expensive than most commercially available organic synthetic polymeric resins.

70 Claims, 5 Drawing Sheets

Phosphate cement with aluminum oxide and wollastonite as fillers

U.S. PATENT DOCUMENTS

| Patent No. | Kind | Date | Inventor | Class |
|---|---|---|---|---|
| 3,184,320 | A | 5/1965 | Michael | |
| 3,391,992 | A * | 7/1968 | Watson | 423/309 |
| 3,392,007 | A | 7/1968 | Ivan et al. | |
| 3,433,586 | A * | 3/1969 | Schulte et al. | 423/309 |
| 3,558,273 | A * | 1/1971 | Beck | 423/308 |
| 3,746,557 | A * | 7/1973 | Shimazaki et al. | 501/127 |
| 3,973,056 | A | 8/1976 | Fessler et al. | |
| 4,066,471 | A * | 1/1978 | Burke | 106/690 |
| 4,294,808 | A * | 10/1981 | Wasel-Nielen et al. | 423/305 |
| 4,339,405 | A | 7/1982 | Paszner | |
| 4,346,065 | A * | 8/1982 | Maurer et al. | 423/305 |
| 4,395,456 | A | 7/1983 | Jackson et al. | |
| 4,478,805 | A | 10/1984 | Langer et al. | |
| 4,487,632 | A * | 12/1984 | Sherif et al. | 106/690 |
| 4,504,555 | A * | 3/1985 | Prior et al. | 428/689 |
| 4,609,484 | A * | 9/1986 | Alberti et al. | 252/184 |
| 4,683,151 | A | 7/1987 | Hamaguchi et al. | |
| 4,721,659 | A | 1/1988 | Tieckelmann et al. | |
| 4,756,762 | A | 7/1988 | Weill et al. | |
| 4,799,652 | A | 1/1989 | Daussan et al. | |
| 4,839,049 | A | 6/1989 | Kinney et al. | |
| 4,846,853 | A * | 7/1989 | Chang et al. | 95/117 |
| 4,891,198 | A * | 1/1990 | Ackilli et al. | 423/308 |
| 5,002,610 | A | 3/1991 | Sherif et al. | |
| 5,039,454 | A | 8/1991 | Policastro et al. | |
| 5,135,576 | A | 8/1992 | Johansen et al. | |
| 5,173,960 | A | 12/1992 | Dickinson | |
| 5,182,049 | A | 1/1993 | Von Bonin | |
| 5,200,187 | A * | 4/1993 | Haushalter et al. | 423/308 |
| 5,283,276 | A | 2/1994 | Best et al. | |
| 5,302,563 | A | 4/1994 | Rumpeltin et al. | |
| 5,338,356 | A | 8/1994 | Hirano et al. | |
| 5,338,524 | A * | 8/1994 | Maurer et al. | 423/309 |
| 5,401,538 | A | 3/1995 | Perito | |
| 5,482,526 | A * | 1/1996 | Havewala et al. | 65/134.1 |
| 5,494,708 | A | 2/1996 | Chess | |
| 5,597,120 | A | 1/1997 | Chess | |
| 5,624,493 | A | 4/1997 | Wagh et al. | |
| 5,645,518 | A | 7/1997 | Wagh et al. | |
| 5,693,303 | A * | 12/1997 | Weideman et al. | 423/308 |
| 5,707,442 | A * | 1/1998 | Fogel et al. | 106/629 |
| 5,718,757 | A | 2/1998 | Guillou et al. | |
| 5,830,815 | A * | 11/1998 | Wagh et al. | 501/155 |
| 5,846,894 | A | 12/1998 | Singh et al. | |
| 5,911,819 | A | 6/1999 | Drs et al. | |
| 5,954,867 | A | 9/1999 | Chow et al. | |
| 5,968,240 | A | 10/1999 | Myers et al. | |
| 6,103,007 | A * | 8/2000 | Wu et al. | 106/690 |
| 6,133,498 | A | 10/2000 | Singh et al. | |
| 6,136,088 | A | 10/2000 | Farrington | |
| 6,153,809 | A | 11/2000 | Singh et al. | |
| 6,183,711 | B1 * | 2/2001 | Nakamoto et al. | 423/308 |
| 6,204,214 | B1 | 3/2001 | Singh et al. | |
| 6,399,021 | B1 | 6/2002 | Heimann et al. | |
| 6,458,423 | B1 | 10/2002 | Goodson | |
| 6,461,415 | B1 | 10/2002 | Sambasivan et al. | |
| 6,498,119 | B2 | 12/2002 | Wagh et al. | |
| 6,518,212 | B1 | 2/2003 | Wagh et al. | |
| 6,561,269 | B1 | 5/2003 | Brown et al. | |
| 6,569,263 | B2 | 5/2003 | Brown et al. | |
| 6,723,162 | B1 | 4/2004 | Cheyrezy et al. | |
| 6,776,837 | B2 * | 8/2004 | Wagh et al. | 106/690 |
| 6,783,799 | B1 | 8/2004 | Goodson | |
| 6,790,275 | B2 | 9/2004 | Macklin et al. | |
| 6,910,537 | B2 | 6/2005 | Brown et al. | |
| 6,929,865 | B2 | 8/2005 | Myrick | |
| 6,936,175 | B2 * | 8/2005 | Bortun et al. | 210/681 |
| 6,960,328 | B2 * | 11/2005 | Bortun et al. | 423/139 |
| 7,001,860 | B2 | 2/2006 | Wagh et al. | |
| 7,083,672 | B2 * | 8/2006 | Wagh et al. | 106/35 |
| 7,160,383 | B2 | 1/2007 | Wagh et al. | |
| RE39,804 | E | 9/2007 | Wu et al. | |
| 7,294,291 | B2 | 11/2007 | Wagh et al. | |
| 7,312,171 | B2 | 12/2007 | Wagh et al. | |
| 7,402,542 | B2 | 7/2008 | Wagh et al. | |
| 7,438,755 | B2 | 10/2008 | Wagh et al. | |
| 7,699,928 | B2 | 4/2010 | Paul | |
| 2002/0123422 | A1 | 9/2002 | Wagh et al. | |
| 2002/0179190 | A1 | 12/2002 | Brown et al. | |
| 2003/0092554 | A1 * | 5/2003 | Wagh et al. | 501/1 |
| 2003/0150614 | A1 | 8/2003 | Brown et al. | |
| 2004/0206267 | A1 | 10/2004 | Sambasivan et al. | |
| 2005/0028705 | A1 | 2/2005 | Wagh et al. | |
| 2005/0160944 | A1 | 7/2005 | Wagh et al. | |
| 2005/0229809 | A1 | 10/2005 | Lally | |
| 2005/0258705 | A1 | 11/2005 | Sayala | |
| 2005/0274290 | A1 | 12/2005 | Wagh et al. | |
| 2005/0288174 | A1 | 12/2005 | Wagh et al. | |
| 2005/0288175 | A1 | 12/2005 | Wagh et al. | |
| 2006/0003886 | A1 | 1/2006 | Wagh et al. | |
| 2006/0048682 | A1 | 3/2006 | Wagh et al. | |
| 2006/0235258 | A1 | 10/2006 | Wagh et al. | |
| 2007/0051271 | A1 | 3/2007 | Kruse et al. | |
| 2007/0051278 | A1 | 3/2007 | Wagh et al. | |
| 2007/0235702 | A1 | 10/2007 | Wagh et al. | |
| 2007/0284120 | A1 | 12/2007 | Rowen | |
| 2008/0020145 | A1 | 1/2008 | Pipko et al. | |
| 2008/0119682 | A1 | 5/2008 | Wagh et al. | |
| 2008/0156225 | A1 | 7/2008 | Bury | |
| 2008/0286609 | A1 | 11/2008 | Surace et al. | |
| 2009/0020186 | A1 | 1/2009 | Pipko et al. | |
| 2009/0075051 | A1 | 3/2009 | Fyfe | |
| 2009/0197991 | A1 | 8/2009 | Bury et al. | |
| 2009/0246389 | A1 | 10/2009 | Mosser et al. | |
| 2010/0083877 | A1 | 4/2010 | Selph et al. | |
| 2010/0213412 | A1 * | 8/2010 | Wong | 252/184 |

FOREIGN PATENT DOCUMENTS

| | | |
|---|---|---|
| EP | 0359002 | 3/1993 |
| EP | 0739953 | 10/1996 |
| GB | 2180231 | 3/1987 |
| JP | 07024815 | 1/1995 |
| WO | WO9402428 | 2/1994 |
| WO | WO2004015005 | 2/2004 |
| WO | WO2009118072 | 10/2009 |

OTHER PUBLICATIONS

Korean Intellectual Property Office, PCT International Search Report and Written Opinion of the International Searching Authority for International Application No. PCT/US2010/046126 dated Feb. 28, 2011.

* cited by examiner

Figure 1: X-ray diffraction pattern of resin produced by sub-stoichiometric reaction between phosphoric acid solution and magnesium oxide Figure 2: X-ray diffraction pattern of cement produced from the resin of Example 2

Figure 3: Resin with less than stoichiometric amount of MgO but heated at 122 °F.

Figure 4: Phosphate cement with aluminum oxide and wollastonite as fillers

Figure 5: Optical micrograph of the fiber reinforced composite made with E-glass and inorganic phosphate resin

INORGANIC PHOSPHATE RESINS AND METHOD FOR THEIR MANUFACTURE

This application is a non-provisional application for patent entitled to a filing date and claiming the benefit of earlier-filed Provisional Application for Patent No. 61/060,860, filed on Jun. 12, 2008, and Provisional Application for Patent No. 61/104,950, filed on Oct. 13, 2008, under 37 CFR 1.53 (c).

The Government has certain rights in this invention pursuant to Work for Others Agreement WFO8504T ANL-IN-07-072 (DOE S-113,477).

FIELD OF THE INVENTION

This invention relates to inorganic synthetic resins and methods for manufacturing them. In general, the invention relates to the manufacture and use of inorganic synthetic resins that mix easily with water and may be conveniently diluted to form an easy-to-use paste for many commercial applications.

BACKGROUND OF THE INVENTION

Organic synthetic resins made of epoxy, polyester, polypropylene and other polymers are widely used in composites such as fiber boards, glass fiber composites, sealants for marble and granite countertop surfaces, aircrafts, body armors etc. These resins are relatively expensive, with prices currently ranging anywhere from two to one hundred dollars per pound. Their green house gas intensity is very high; they are flammable; and volatile organic compounds released by them during their use present a health hazard for a user.

Technologies exist for formulating inorganic mineral based resins but these are usually based on alkali metal aluminosilicates and alkali metal boroaluminosilicates. See, for example, U.S. Pat. No. 5,532,196. These technologies for the most part are limited to one type of formulation and do not always allow for the manufacture of resins with wide range of formulations, properties and uses.

Several patents have also been granted on the subject of phosphate cements and ceramics that are made by acid-base reactions between phosphoric acid, or an acid-phosphate, and a metal oxide. See, for example, U.S. Pat. Nos. 6,204,214 and 6,518,212, of Wagh et al., researchers at Argonne National Laboratory and the University of Chicago. The products disclosed in these patents are hard, and replicate properties of either cement or ceramic, or both.

SUMMARY OF SELECTED EMBODIMENTS OF THE INVENTION

Certain embodiments of this invention relate to techniques for carrying out the chemical reactions necessary to inexpensively manufacture commercial inorganic synthetic resins having high strength and useful in making other high-strength products. A particular embodiment of the invention relates to a method for manufacturing chemically stable inorganic resins in ambient conditions that allow the manufacturer to store and transport these types of resins. In one specific embodiment, the invention relates to a method for modifying inorganic resins so as to produce high-strength, rapid-setting phosphate cements. In another specific embodiment, the invention relates to the thermal treatment of certain resins in order to manufacture high-strength ceramics. Other embodiments relate to a method for the manufacture of inorganic phosphate resins that uses environmentally friendly techniques to provide improved efficiencies in the commercial production of these resins.

Many of the new formulations provided by the invention are based on phosphoric acid solutions. Some embodiments of the resins are produced by a partial reaction of phosphoric acid solutions with oxides, or oxide minerals. Certain embodiments will employ sparsely-soluble oxides and sparsely-soluble oxide minerals, which are those oxides and oxide minerals that have limited solubility in water. These oxides and oxide minerals are commonly available in powder form. They are also often available in granular form and, in some cases, in liquid form. According to certain methods of this invention the resin is made by the slow addition of the sparsely-soluble oxides, or the sparsely-soluble oxide minerals, preferably in powder form, to an aqueous solution of phosphoric acid with a pH of 0, or close to 0, while continuously stirring and/or agitating. One example of an aqueous solution of phosphoric acid is a solution where the solvent is water ($H_2O$) and the solute is phosphoric acid ($H_3PO_4$). Although some (less efficient) invention embodiments may operate at comparatively high pHs (e.g., up to about 2.5), the phosphoric acid aqueous solution of preferred embodiments should have a pH lower than about 0.5, and most preferably as close to 0 as possible.

The sparsely-soluble oxide powders, or sparsely-soluble oxide mineral powders, are added to the solution slowly and in controlled amounts so as to form a paste, allow good wetting of individual grains of the powders and avoid any excessively exothermic reactions. As the powders are added the pH of the paste tends to rise. When the pH of the paste is higher than approximately 2.5, but preferably lower than approximately 6.0, the paste is dried. The dry resin can be conveniently stored for future use. As shown in the examples set forth below, the resulting inorganic phosphate resin has a unique mineral composition and is not readily reverted to powder by simple methods such as heating. Typically, these resins mix with water easily and may be diluted rapidly, and hence they can be mixed with a small amount of water to produce a dilute paste for actual commercial uses. Dilution is endothermic, and the paste cools as its viscosity drops. Addition to the paste of a predetermined amount of an alkaline oxide, or an oxide mineral, as an activator, initiates an exothermic reaction, and the resin then sets within a short time. The set product can be used as an instant adhesive, or as a matrix for composites, or as cement for use in many structural materials applications.

Certain embodiments of this invention disclose phosphate-mineral-based resins that can replace organic synthetic resins with these attributes in almost all applications. In preferred embodiments, these phosphate-mineral-based resins are non flammable, water-based and non-volatile, contain none or minimal hazardous inorganic or organic compounds, may reduce green house emission by up to about 80% when compared to organic resins, and are stable at high temperature; yet they are typically cheaper than organic synthetic (polymeric) resins. Still further embodiments of this invention also disclose the compositions of such phosphate-mineral-based resins, as well as methods for their manufacture and for modifying them to produce rapid-setting phosphate cements.

These inorganic synthetic resins have numerous commercial applications. For example, they may be used to produce adhesives, coatings and matrices for fiber-reinforced composites, as well as to manufacture rapid-setting cements. They may also be used to bond the surface of wood, metal and many other materials; and they also have applications in the production of composites with saw dust, wood chips and wood fiber, as well as glass and polymer fibers. In many such commercial applications, the synthetic resins are mixed with water to produce a paste, into which a predetermined amount of oxide is then mixed slowly. This slow mixing results in a paste that is rapid-setting. The rate of setting depends on the amount of oxide added to the paste, and hence one can obtain a resin product with controllable rate of reaction.

When these inorganic synthetic resins are used to produce certain embodiments of the rapid-setting cements, a resin is mixed with water to produce a paste, into which a predetermined amount of oxide, or oxide mineral, is then mixed slowly. This slow mixing is one method for generating a cement paste that is rapid-setting. Again, the rate of setting depends on the amount of oxide, or oxide mineral, added to the paste, and hence one can obtain cement with a controllable rate of reaction. The resin may be mixed with water prior to adding the predetermined amount of oxide, or oxide mineral, or, alternatively, the water and the predetermined amount of oxide, or oxide mineral, may be added simultaneously and the mixture then mixed slowly. In some cases, e.g., when oxides of very low solubility, such as aluminum oxide ($Al_2O_3$), or zirconium oxide ($ZrO_2$), are used to make the resins, a thermal treatment of the resin may be used to produce the rapid-setting cement, or "ceramic". The thermal treatment may be accomplished, for example, by subjecting the mixture of resin, water and oxide to heating at between about 250° F. and about 500° F. for at least one-to-five hours in the case of aluminum oxide and other trivalent oxides. Likewise, if zirconium oxide or similar quadrivalent oxides are used, the thermal treatment may be accomplished by subjecting the mixture of resin, water and oxide to heating at between about 400° F. and 700° F. for at least one-to-five hours. As can be seen, and as shown in Example 8, below, the temperature of the thermal treatment used in these cases is much lower than the temperature used in the production of ceramics by sintering packed oxides.

Several examples discussed below demonstrate the uniqueness of the inorganic phosphate resin embodiments described herein, as well as the method for manufacturing and using them. These resins have a wide range of industrial and commercial applications and, in addition to the commercial applications already mentioned above, they may be used as reactants for manufacturing chemically bonded phosphate ceramics and impermeable paints, and as base materials for making layers of fire protection coatings.

Additional embodiments of the present invention disclose resins that allow homogeneous mixing and, hence, uniform wetting of powders, and thus afford more time for mixing, pumping and application of the cement paste. These embodiments also provide for safer transportation of the resins due to their higher pH and consolidated structure of large chunks, and permit the use of uncalcined oxide powders to manufacture the resins. Use of uncalcined powders reduces the cost of the final product and makes the product more environmentally friendly. The invention provides a wide range of formulations that may be used in making chemically stable inorganic resins in cost efficient fashion.

DETAILED DESCRIPTION OF SELECTED EMBODIMENTS OF THE INVENTION

Figure 1:
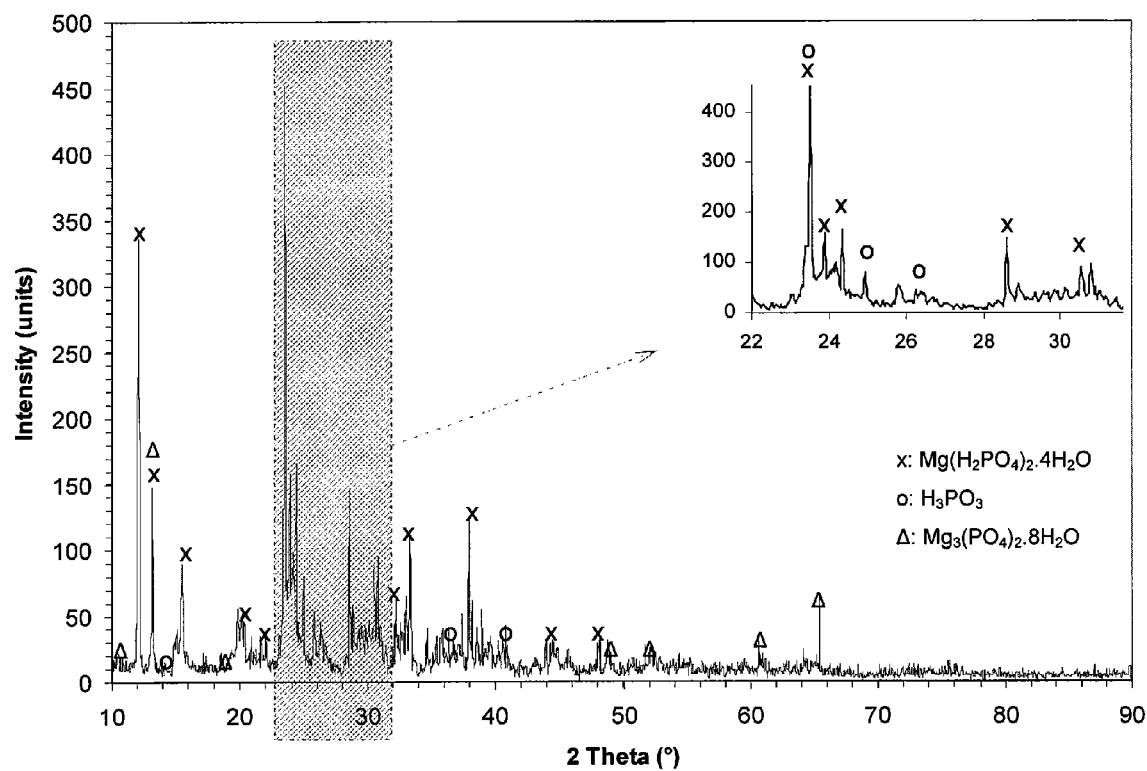
FIG. 1 is an X-ray diffraction pattern diagram illustrating the results of the X-ray diffraction studies reported in Example 1 below.

Many embodiments of the inorganic synthetic resin formulations of this invention have the chemical formula $A(H_2PO_4)_m \cdot nH_2O$, where "A" is an "m"-valent element, and "n" is the number of moles of water of crystallization. The valence "m" is equal to or higher than 2, i.e., $m \geq 2$. Preferably, "m" is between 2 and 4. The number of moles of water of crystallization "n" is between 2 and 25. The pH of these resin formulations is between about 2.5 and about 6.0, including any sub ranges therein between. Resins with a pH between about 3.0 and about 5.0 are generally more effective in the manufacture of products by acid-base reaction; for that reason a pH of in that range is more preferred, although the scope of the invention should not be considered as strictly limited to either of the above ranges. In certain embodiments these resins are produced by the reaction

$$AO_{m/2} + mH_3PO_4 + (n-m/2)H_2O = A(H_2PO_4)_m \cdot nH_2O \qquad (1)$$

By way of illustration, a magnesium dihydrogen phosphate resin such as $Mg(H_2PO_4)_2 \cdot 4H_2O$ may be made by the reaction

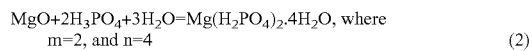
$$MgO + 2H_3PO_4 + 3H_2O = Mg(H_2PO_4)_2 \cdot 4H_2O, \text{ where } m=2, \text{ and } n=4 \qquad (2)$$

Also by way of illustration, an aluminum dihydrogen phosphate resin such as $Al(H_2PO_4)_3 \cdot 4H_2O$ may be made by the reaction

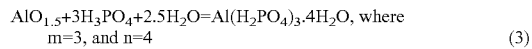
$$AlO_{1.5} + 3H_3PO_4 + 2.5H_2O = Al(H_2PO_4)_3 \cdot 4H_2O, \text{ where } m=3, \text{ and } n=4 \qquad (3)$$

An aluminum trihydrogen phosphate resin such as $AlH_3(PO_4)_2 \cdot nH_2O$ may also be made by the reaction

$$AlO_{1.5} + 2H_3PO_4 + (n-1.5)H_2O = AlH_3(PO_4)_2 \cdot nH_2O \qquad (4)$$

The aqueous solution of phosphoric acid that is used in certain methods of this invention should have a strength between about 33% and about 79% $H_3PO_4$ by weight, and has a pH lower than about 2.5, preferably lower than about 0.5, and more preferably 0 or very close to 0. The aqueous solution of phosphoric acid may be generated, for example, by diluting $H_3PO_4$ with water, or dissolving $P_2O_5$ in water, in controlled amounts and under conditions such that the pH of the resulting solution is lower than about 2.5. Alternatively, the solution may be prepared by dissolving phosphate salts in an aqueous medium in controlled amounts and under conditions such that the pH of the resulting solution is lower than about 2.5, and preferably lower than about 0.5. Preferred phosphate salts include dihydrogen phosphate salts such as sodium dihydrogen phosphate, magnesium dihydrogen phosphate and aluminum dihydrogen phosphate. The aqueous solution of phosphoric acid may also be formed from metal phosphates such as those disclosed in U.S. Pat. No. 6,518,212, column 4, lines 34 to 44, which are incorporated by reference herein.

When phosphoric acid is used to form the stipulated starting low-pH aqueous solution of phosphoric acid, the level of dilution of the phosphoric acid will depend on the acid phosphate formed by addition of the oxide to the phosphoric acid. Preferably, the amount of water should be more than that needed to dissolve all the acid phosphate formed during the process. Likewise, when an acid phosphate is used to form the stipulated starting low-pH aqueous solution of phosphoric acid, the level of dilution of the acid phosphate will depend on the particular acid phosphate formed by the addition of the oxide to the phosphoric acid solution formed by the initial acid phosphate. Preferably, the amount of water should be more than that needed to dissolve all the particular acid phosphate formed during the process. A rule-of-thumb in many embodiments is that the water content should be at least ten times that of acid phosphate to be formed or to be used.

In certain embodiments, the phosphoric acid solution is treated under controlled conditions and used to produce a resin by the slow addition of a sparsely-soluble oxide such as MgO (magnesium oxide) in powder form, or a sparsely-soluble oxide mineral such as $CaSiO_3$ (calcium silicate) in powder form. In the context of the addition of a sparsely-soluble oxide herein, a sparsely-soluble oxide refers to an oxide that has very low solubility in an acid solution and is almost insoluble in water. In the context of the addition of a sparsely-soluble oxide mineral herein, sparsely-soluble refers to the solubility in an acid solution of whichever oxide in the mineral dissolves first when mixed with the aqueous solution of phosphoric acid. Thus, when using a sparsely-soluble oxide mineral, if, for example, the mineral has two chemically different oxides (within the class of stipulated oxides), say Oxide A and Oxide B; and Oxide A is sparsely-soluble but Oxide B is insoluble, then the mineral is considered a sparsely-soluble oxide mineral because at least one oxide in the mineral is sparsely-soluble.

In general, powders that are suited for the formation of the synthetic resins comprise sparsely-soluble oxides and sparsely-soluble oxide minerals of all valences. Generally, divalent and trivalent oxides are sparsely-soluble. Therefore, divalent and trivalent oxides are preferred for the production of these resins. Specifically, these include divalent and trivalent metal oxides, such as CaO, MgO, ZnO, MnO, FeO, CoO, $Al_2O_3$, $La_2O_3$ and $Y_2O_3$, as well as minerals of these oxides, such as $CaSiO_3$ and $Fe_3O_4$. The acid-base reaction of divalent oxides and their minerals is generally rapid, while that of trivalent oxides and minerals tends to be somewhat slower.

Quadrivalent oxides and their minerals tend to be insoluble or exhibit very low solubility in water. It has been found, however, that the solubility of quadrivalent oxides in water may be increased by slightly raising the temperature of the solution during the reaction, but below the boiling temperature of the water. Unlike divalent and trivalent oxides, which release metal ions into the solution and form dihydrogen phosphates of these ions, quadrivalent oxides and their minerals release partially oxidized ions (such as $ZrO^{++}$) and form dihydrogen phosphates of these ions; for example, $ZrO_2$ will release $ZrO^{++}$ in aqueous solution and will form $ZrO(H_2PO_4)_2$. Quadrivalent oxides selected from the group consisting of $SrO_2$, $TiO_2$ and $ZrO_2$ are preferred.

Additional examples of sparsely-soluble oxides and sparsely-soluble oxide minerals are also those mentioned and described, for example, in U.S. Pat. No. 6,518,212, column 4, lines 45 through 66, which are hereby incorporated by reference.

MgO and $Al_2O_3$ are two preferred oxides for treating the phosphoric acid solution in accordance with certain methods of this invention, but other forms of oxides may also be used. For example, divalent forms of oxides of zinc, barium, cobalt, manganese and strontium may be used if they are economically available. One may also use oxide-containing minerals such as $CaSiO_3$ (wollastonite), $MgSiO_3$ (talc) and $Fe_3O_4$ (magnetite), and other oxide minerals that sparsely dissolve in phosphoric acid solutions, such as various silicates, titanates, vanadates, borates and aluminates. Alternatively, it is possible to use oxide-releasing industrial and mining waste streams, such as fly ash, iron mine tailings, and red mud produced from Bayer process refining of bauxite to alumina. $CaSiO_3$ (wollastonite), $MgSiO_3$ (talc) and $Fe_3O_4$ (e.g., magnetite from iron tailings) are the preferred oxide-containing minerals for treating the phosphoric acid in accordance with many embodiments of this invention.

Monovalent oxides such as those of sodium and potassium are less preferred because they are not sparsely-soluble, but are very soluble, and, therefore, they tend to dissolve in phosphoric acid much too rapidly. This rapid dissolution is exothermic, and the released heat increases the temperature of the reacting solution toward its boiling point, making the formation of resins difficult without the use of elaborate cooling techniques, but nevertheless within the scope of the present invention.

In one preferred embodiment the sparsely-soluble oxides, or sparsely-soluble oxide minerals, preferably in powder form, are added to the acid solution in controlled amounts, and slowly mixed while continuously stirring and/or agitating so as to form a paste, allow good wetting of individual grains of the powders and avoid an excessively exothermic reaction. The mixing and continuous stirring may be conducted by agitating the mixture by means of commercially-available mixers and agitators that impart mechanical energy, such as sonic agitators, vertical paddle mixers, gas-powered ribbon pipe mixers, drum mixers and the like. In the context of this described embodiment, slowly mixing while continuously stirring and/or agitating means the incremental addition of the sparsely-soluble oxide, or sparsely-soluble oxide mineral, to the low-pH aqueous solution of phosphoric acid, while preventing the oxide or oxide mineral from settling at the bottom. In other words, one should slowly mix the reactants and provide enough mechanical-energy-imparting stirring and/or agitation to allow the oxide, or oxide mineral, to dissolve and prevent it from settling and forming a hard ceramic mass. In one embodiment, incremental addition means that the amount of sparsely-soluble oxide, or sparsely-soluble oxide mineral, that is added to the low-pH aqueous solution of phosphoric acid is added at a slow rate, i.e., a rate of not more than about 0.5% by total weight of mass of oxide, or oxide mineral, and solution of phosphoric acid per minute. This does not mean that the addition of the oxide, or oxide mineral, cannot be stopped or discontinued for short periods of time and restarted again so long as, overall, no more than about 0.5% of oxide, or oxide mineral, by total weight of mass is added per minute when practicing this embodiment. This rate of incremental addition is particularly suitable to situations where sonic agitators or other high-efficient mixers are not used. Likewise, continuous stirring (or substantially continuous stirring) means that some minor discontinuity in stirring and/or agitation may be acceptable so long as the oxide or oxide mineral does not settle and/or form a hard mass.

Such incremental addition of the oxide, or oxide mineral, should preferably be carried out under controlled conditions so that the temperature of the mixture of reactants during resin formation does not exceed about 90° F. While alternate embodiments of the resin may be made at higher temperatures, maintaining the temperature at or below about 90° F. helps prevent the oxides, or oxide minerals, added to the solution from reacting spontaneously and generating ceramic particles within the resins and, as a result, producing resin that is less homogeneous. The temperature may be controlled by removing the excess heat from the reactants and/or slowing the rate of oxide addition in order to maintain the temperature below about 90° F. In one embodiment, a temperature sensor in the paddle of the mixer, or on the outside wall of the mixer, may be used as a controlling device for feeding the oxide or oxide mineral. When the temperature rises beyond about 90° F. the sensor may send a signal to the feeder to stop the feed of the oxide, or oxide mineral, and may then send a message to resume the feed when the temperature drops to, for example, 75° F. In warm climates, additional cooling devices may be beneficial. Such commercial devices are usually readily available.

In certain cases it is desirable to accelerate the dissolution of oxides or oxide minerals using highly-efficient mixers such as sonic mixers and the like. In such cases also, it is preferred that the temperature is maintained below about 90° F. by, for example, removing heat from the mixture of reactants and/or cooling the mixture by some external means. Alternatively, in such cases, the temperature may be maintained below about 90° F. by the judicious intermittent use of such highly-efficient mixers. Thus, for example, sonic mixers may be turned on and used to effect the mixing and allow the temperature of the reactants to increase and approach about 90° F., at which point the sonic mixers may be programmed to go off for a certain period of time to allow the temperature to decrease, say to 75° F. or so, and then be turned on again to continue the mixing and allow the temperature of the reactants to increase and again approach about 90° F., at which point the sonic mixers may go off again, and so on and so forth in intermittent fashion. This is a particularly effective manner of conducting the mixing and stirring when such highly-efficient mixers are used.

In some cases, the incremental addition of the oxide, or oxide mineral, is preferably carried out for at least 30 minutes and, more preferably, for at least 3 hours. An example of one of these cases would be a situation where highly-efficient mixers such as sonic mixers are not available to accelerate the dissolution of oxides or oxide minerals. Again, in these cases one should also ensure that the temperature of the reactants is maintained below about 90° F. by, for example, removing heat from the mixture and/or cooling the mixture by some external means. Although preferred embodiments maintain the mixture below about 90° F., other embodiments may allow the mixture to exceed 90° F., depending on the desired resin quality and end use.

It has been observed that the pH of the paste rises gradually as the oxide is added. In preferred embodiments, after the pH reaches about 2.5, but before it exceeds about 6.0, the paste-like formed mixture is allowed to be dried in air. The result of this treatment is a resin that can be slightly wet like tooth paste, or completely dry and made up of dry chunks, depending on how long it has been dried. This resin can be conveniently stored for future use. If the pH of the formed mixture is allowed to go much higher than about 6.0 (e.g., in the range of about 6.0 to 8.0) other steps may be required to prevent the formation of an undesirable solid mass.

Drying the formed mixture, in the context of this invention, means the removal of some portion of free water (as opposed to bound water), and it is preferably conducted in air in order to save energy. Drying may also be effected by other known techniques such as forced-air circulation, nitrogen drying and vacuum drying (providing a negative partial pressure of air). Drying prevents or minimizes the corrosion of the containers used to transport the resin products and improves the handling, transportation and storage of the products. It is not necessary that all of the free water be removed during drying. Preferably, at least between about 50% and about 70% of the free water should be removed. It is also preferred that the drying operation be conducted with minimal or no addition of heat; but some embodiments may employ heat-aided drying.

The process for manufacturing synthetic phosphate resins and making rapid-setting cements or "ceramics", from these resins in accordance with many embodiments of the present invention comprises two basic steps. The $1^{st}$ step comprises the production of the inorganic resin. The aqueous solution of phosphoric acid used should have a strength between about 33% and about 79% $H_3PO_4$ by weight, and preferably about 50% $H_3PO_4$ by weight. The starting solution should preferably have a pH lower than about 2.5, more preferably lower than about 0.5, and most preferably 0 or very close to 0. Upon addition of the oxide, or oxide mineral, the partially reacted solution generally becomes a paste when its pH reaches approximately 2.5 or above. In a preferred embodiment, mixing is carried out by slow dosing and by monitoring the temperature, as well as the pH, so that the temperature does not rise much higher than about 90° F. at any time and the pH does not rise much higher than about 6.0 as the oxide, or oxide mineral, is added. If the temperature rises above about 90° F. in this embodiment, it is recommended that stirring be continued and the paste be cooled below about 75° F. before the next dosing of oxide or oxide mineral is carried out.

The amount of oxide, or oxide mineral, to be added to the solution in accordance to these process embodiments should be less than the amount needed for complete reaction, i.e., it should be a sub-stoichiometric amount; otherwise, the reactants are likely to form an unmanageable solid mass instead of a manageable partially reacted solution. Using between about 40% molar and 90% molar of the stoichiometric amount of oxide, or oxide mineral, yields satisfactory results in most cases. In a preferred embodiment, between about 60% molar and 80% molar of the stoichiometric amount of oxide, or oxide mineral, is used. In a most preferred embodiment that amount is between about 70% molar and 80% molar. This paste is then mixed continuously until the desired portion of free water from the paste evaporates. By evaporating water from the paste sufficiently, one can produce a resin with the consistency of toothpaste. At this stage the resin is stable, binds some water in its crystals and resists the release of water, even when dried at warm temperatures (e.g., at 194° F.-212° F.), and may be stored as an inorganic phosphate resin. Drying is preferably conducted to form a powder resin or a thick gel resin. The resulting resin may be used just like an organic resin, particularly if slight heating is imparted for it to set.

The $2^{nd}$ step of the process for manufacturing synthetic phosphate resins and making rapid-setting cements from these resins involves the addition of more oxide, or oxide mineral, to the inorganic resin produced in the $1^{st}$ step, thereby causing the full stoichiometric reaction preferred in making these embodiments of the rapid-setting cements.

It should be noted that even among the sparsely-soluble oxides, or sparsely-soluble oxide minerals, there exists a wide range of solubility. For example, the solubility of magnesium oxide is several orders of magnitude higher than the solubility of aluminum oxide. Depending on the solubility of the oxide, or oxide mineral, addition of more oxide or oxide mineral to the resin solution results in a complete reaction that meets the stoichiometric requirement of an acid-base reaction. Oxides such as magnesium oxide can readily dissolve sufficiently and, in such cases, the reaction occurs at ambient temperature. On the other hand, oxides such as aluminum oxide, which has a solubility lower by an order of magnitude when compared to that of magnesium oxide, usually require higher reaction temperatures in order to sufficiently dissolve in the resin solution and cause the formation of the cement at that temperature. Examples of these two types of oxides are given as illustration of this fact in some of the Examples discussed hereinbelow. These reactions result in a rapid-setting cement paste that sets into a rapid-setting phosphate cement or ceramic. The amount of sparsely-soluble oxide, or sparsely-soluble oxide mineral, added in this $2^{nd}$ step may be a relatively small quantity if one has added most of the oxide, or oxide mineral, in the $1^{st}$ step. The addition of more oxide, or oxide mineral, to the resin solution results in a complete reaction that meets the stoichiometric requirement of an acid-base reaction. This reaction results in a rapid-setting cement paste that will set into rapid-setting phosphate cement. This additional amount may be a relatively small quantity if one has added most of the oxide in the $1^{st}$ step. The addition of excess oxide, or oxide mineral, also accelerates the setting reaction. Thus the last dose of oxide, or oxide mineral, may be used as an activator of the paste to initiate the setting reaction. In some cases it may be possible to make a type of cement that is still useful for certain applications by adding the oxide, or oxide mineral, in amounts slightly less than (e.g., 95% to 99%) those needed to meet the stoichiometric completion of the acid-base reaction.

This two-step process for making rapid-setting cements may be conveniently modified in order to manufacture synthetic phosphate resins and make adhesives or matrices for fiber-reinforced composites.

By way of an illustration of the manner in which the process for making rapid-setting cements is carried out, a resin is first made by adding 40 grams of MgO powder may be added to a solution of 100 ml of water and 260 grams of 75% $H_3PO_4$ in approximately one hour. It has been found that, in certain embodiments, if an alkaline oxide or oxide mineral is added to the phosphoric acid solution, the acid-base reaction will be fierce and generate significant heat, causing the solution to boil and an incoherent precipitate to form. On the other hand, it has been found in these embodiments that, if the oxide or oxide mineral is added in small doses and the solution is stirred continuously and cooled, the resulting acid-base reaction will be manageable. Cooling may be provided by any conventional means, including simply allowing the solution to cool at the prevailing ambient temperatures. In any case, the cooled solution of these embodiments should have a temperature below about 90° F., and preferably between about 75° F. and 90° F. Thus, producing the inorganic resin in these embodiments involves the slow dosing of the oxide or oxide mineral to keep the temperature of the solution within control. It has also been found that slow dosing also wets the powder grains much better than if fine powders are quickly mixed into the acid. The amount of oxide, or oxide mineral, to be added to the solution in accordance to these process embodiments should also preferably be less than the amount needed for complete reaction, i.e., it should be a sub-stoichiometric amount; otherwise, the reactants are likely to form an unmanageable solid mass instead of a manageable partially reacted solution. The additional oxide, or oxide mineral, is then added to the resin solution so as to cause the complete reaction that meets the stoichiometric requirement of an acid-base reaction. This technique results in a rapid-setting cement paste that will set into rapid-setting phosphate cement.

In one embodiment of this technique, the addition of oxide, or oxide mineral, is stopped as soon as the stoichiometric amount of oxide, or oxide mineral, has been reached. In another embodiment, additional oxide, or oxide mineral, is added beyond the stoichiometric amount.

As shown on Table 1, below, the non-limiting examples of chemical reactions that take place when forming the solid mass of cement may be represented by the following equations, which depend on the valences of the oxides, or oxide minerals, used in forming the resin and the cement or ceramic.

TABLE 1

Formulations of cements made with resins of oxides, or oxide minerals, of various valences. Generalization of resins to divalent, trivalent and quadrivalent oxide materials

| Reaction to make cement | Generic chemical reaction | Examples |
| --- | --- | --- |
| Divalent oxide resin and another divalent oxide | $A(H_2PO_4)_2 \cdot mH_2O + BO + nH_2O = AHPO_4 \cdot sH_2O + BHPO_4 \cdot tH_2O + (m + n + 1 - s - t)H_2O$. | A = Mg, m = 4, n = 1, B = Ca. $Mg(H_2PO_4)_2 \cdot 4H_2O + CaO + H_2O = MgHPO_4 \cdot 3H_2O + CaHPO_4 \cdot 2H_2O + H_2O$. If A = B = Mg, we have $Mg(H_2PO_4)_2 \cdot 4H_2O + MgO + H_2O = 2MgHPO_4 \cdot 3H_2O$ |
| Trivalent oxide resin and divalent oxide | $2A(H_2PO_4)_3 \cdot mH_2O + 3BO + nH_2O = A_2(HPO_4)_3 \cdot sH_2O + 3BHPO_4 \cdot tH_2O + (2m + n + 3 - s - 3t)H_2O$. Here A is trivalent and B is divalent. | A = Al, m = 0, n = 3, B = Mg. $2Al(H_2PO_4)_3 + 3MgO12H_2O = Al_2(HPO_4)_3 + 3Mg(PO_4) \cdot 3H_2O$. If A = Al = B, the equation becomes, $2Al(H_2PO_4)_3 + Al_2O_3 = 2Al_2(HPO_4)_3 + 3H_2O$. |
| Divalent oxide resin and another trivalent oxide | $6A(H_2PO_4)_2 \cdot mH_2O + B_2O_3 + nH_2O = 6A(HPO_4)_2 \cdot sH_2O + 2B(HPO_4)_3 \cdot tH_2O + (n + 6m + 3 - s - t))H_2O$. Here A is divalent oxide and B is trivalent. | A = Mg, m = 4, n = 2, B = Al. $3Mg(H_2PO_4)_2 \cdot 4H_2O + Al_2O_3 + 2H_2O = 3MgHPO_4 \cdot 3H_2O + Al_2(HPO_4)_3$ |
| Trivalent oxide resin and trivalent oxide | $2A(H_2PO_4)_3 \cdot mH_2O + B_2O_3 + nH_2O = A_2(HPO_4)_3 \cdot sH_2O + B_2(HPO_4)_3 \cdot tH_2O + (2m + n + 3 - s - t)H_2O$. $AH_3(PO_4)_2 \cdot nH_2O + BO_{1.5} =$ | A = Al, m = n = 0, B = La $2Al(H_2PO_4)_3 + La_2O_3 = Al_2(HPO_4)_3 + La_2(HPO_4)_3 + 3H_2O$ If A = B = Al, we have $Al_2(H_2PO_4)_3 + AlO_{3/2} = 2Al_2(HPO_4)_3 + 3H_2O$ If A = B = Al, we have |

TABLE 1-continued

Formulations of cements made with resins of oxides, or oxide minerals, of various valences.
Generalization of resins to divalent, trivalent and quadrivalent oxide materials

| Reaction to make cement | Generic chemical reaction | Examples |
|---|---|---|
| | $A(PO_4)_2 \cdot sH_2O + B(PO_4)_2 \cdot tH_2O$; $s + t = n + 1.5$ | $AlH_3(PO_4)_2 \cdot nH_2O + AlO_{1.5} = 2AlPO_4 + (n + 1.5)H_2O$ |
| Quadrivalent oxide resins | Sparsely soluble quadrivalent oxides will form resins of divalent oxide ions. For example, zirconium oxide ($ZrO_2$) will form resin of $ZrO^{++}$. Thus the resin will be a product such as $ZrO(H_2PO_4)_2 \cdot nH_2O$ and the ceramic will be $ZrOHPO_4 \cdot nH_2O$. | |

The generic formulations given on the second column in Table 1, above, constitute one example range of products that may be produced from the appropriate resins represented by the first term on the left-hand side of each equation. Thus, resins may be produced with divalent and trivalent oxides, or their minerals, and also by using quadrivalent metal oxides, or their minerals (as indicated by the second column of the last row in Table 1).

Generally, no thermal treatment is required or used when making these resins using divalent oxides. When using some trivalent oxides and most quadrivalent oxides in making these resins, a thermal treatment is recommended because of the rather low solubility of these oxides when compared to the solubility of divalent oxides. Because a thermal treatment is often used to make hard products when trivalent or quadrivalent oxides are used, these products are sometimes referred to as "ceramics".

Many embodiments of the present invention affords the convenience of allowing readily available and relatively inexpensive materials to be used as reactants in the method for manufacturing the inorganic synthetic resins and making rapid-setting cements from these resins. Thus, these embodiments may start with phosphoric acid ($H_3PO_4$) to produce the low-pH aqueous acid solution. The acid solution is added slowly to water and stirred continuously. Dihydrogen phosphates of low pH may also be used to manufacture the synthetic resins. In preferred embodiments, the pH of these phosphates should be less than about 2.5. Magnesium dihydrogen phosphate or aluminum dihydrogen phosphates are ideal. The dissolution of the acid is exothermic and hence precaution needs to be taken to add it slowly. When an oxide is added to this solution, a partial acid-base reaction occurs, which is also exothermic.

Preferred oxides in this invention are divalent oxide powders because their resins can be used to produce cements at ambient temperatures. Resins of trivalent oxides are more suited for the production of ceramic embodiments at higher temperatures. Divalent oxide powders are sparsely-soluble and have an aqueous solubility product constant between about 8 and 15, while trivalent and some quadrivalent oxides have solubility product constants higher than 15. If the solubility product constant is higher than about 40, then the oxides are so insoluble that they significantly increase the difficulty of forming resins and ceramics. Thus, the oxides of many embodiments will have a solubility product constant of between about 8 and about 40 (or any sub-range there between). While employing oxides with solubility product constants greater than about 40 or less than about 8 is not excluded from the scope of the invention, it is significantly less preferred.

In some of the described embodiments it has been found that very slow dosing of the phosphates and powders is preferred for the production of superior resins. Typically, the mixing step of many embodiments takes about one hour but, in most cases, should be at least about thirty minutes. It has also been found that a high-quality storable resin may be produced by adding a sub-stoichiometric amount of oxide, or oxide mineral, i.e., between about 40% molar and about 90% molar, to phosphoric acid or to an acid phosphate solution. In certain embodiments, the solution is then mixed until most of the water is removed from the solution, and then it is air-dried to form a semi-solid resin. The resin can be activated by dissolving it in small amount of water and then adding additional amount of oxide or oxide mineral in the solution. When a stoichiometric amount of oxide or oxide mineral is mixed, the resin will set into solid cement when sparsely-soluble divalent oxides, or oxide minerals, are used, and into solid ceramic when sparsely-soluble trivalent oxides, or oxide minerals, are used.

The resin may be diluted in water to an extent sufficient to accommodate fibers or any other second phase materials and to wet them suitably to produce composites having a high loading of fibers and/or other materials. The water may be evaporated at the end of the process to obtain a strong durable product. One may also use industrial and mineral waste streams that release oxides in acid solutions for this purpose. The combination of oxides shows excellent strength results. In one example, aluminum oxide and calcium silicate may be used in the ratio of 2:1 for optimal strength. However, other examples may also use only one of the two or both in other ratios. These ratios may not give optimal strength, but will give products with strength higher than without them. Additional oxides also help in stabilizing the acidity of the resin. In case all activator oxide has not reacted, the unreacted portion of the oxide will form alkaline cement. Since most natural environments are alkaline, such a product may be stable in natural environments. The products discussed above which are made by the methods described herein include resin, partially reacted resin, fully reacted cement, adhesives and composites of very high flexural strength. The methods discussed above for making these unique inorganic resins include the specific methods for producing the resins and for producing cement using the resins and the method of heating sub-stoichiometric resin that sets upon heating, non-limiting examples of which are described in the case studies and descriptions provided above.

The embodiments described above provide novel inorganic mineral-based synthetic resins that generally do not burn, i.e., they are non-flammable and exhibit ASTM standard zero-flame-spread ASTM E-84 material characteristics. These resins are cheaper, earth-and-health friendly, more flame-resistant and more recyclable than many prior art resins. Preferred embodiments have a chemical composition with a phosphoric acid content of between about 2 and about 25 times (or any sub-range therebetween), by weight, that of the oxide chemical composition of the resin, and an amorphous consistency that allows the resin to be easily applied. This consistency is the result of the viscosity of the resins, which is between about 15,000 and about 40,000 centipoises. Certain embodiments also have a shelf life of at least about 30 days. In the context of this invention, shelf life is defined as the time it takes the resin, from the day it is manufactured, to degrade to a point when, because of its physical condition, it may no longer be used for its intended purpose. One example of this degradation is a viscosity outside the 15,000 to 40,000 centipoise range.

The present invention also includes resins that do not necessarily have these advantages over prior art resins.

Laboratory tests have been conducted in order to further delineate relevant parameters of the resins. These tests are described in the following Examples. The Examples are sometimes referred to as "Case Studies". In general, these Examples include the use of two types of oxides, or oxide minerals, to with, divalent oxides and oxide minerals with comparatively higher solubility, illustrated by MgO (magnesium oxide) and $CaSiO_3$ (calcium silicate) which contains CaO (calcium oxide), a divalent oxide; and trivalent oxides of comparatively lower solubility, illustrated by aluminum oxide ($Al_2O_3$). Examples 1, 2, and 3 specifically represent cases of divalent oxides; Examples 4 and 5 represent cases of divalent minerals; Examples 6 and 7 demonstrate the use of the divalent oxide or oxide mineral resins; and Example 8 illustrates the use of a trivalent oxide.

Example 1

Production of storable resin. In this test, 260 grams of 75% concentrated $H_3PO_4$ were added to 180 ml of water, and the acid was added to the water in a Hobart table top mixer very slowly, i.e., for at least 30 minutes and as long as one hour, to ensure that the mixture did not overheat. To this mixture were added 40 grams of magnesium oxide that was calcined at 2,400° F. Addition of the oxide was also carried out very slowly, i.e., for at least 30 minutes and as long as one hour, to ensure that the acid-base reaction did not generate an excessive amount of heat. When all oxide was added, the pH of the paste was 2.65. The paste was then allowed to mix for several hours until it formed a very thick paste and further mixing became difficult. The container was left open to allow further drying. The paste settled into solid chunks, which were stored in closed plastic containers. The results of the analysis of the solid chunks using X-ray diffraction instrumentation are shown in FIG. 1, where it is noted that the dominant phases in the solid chunks are magnesium dihydrogen phosphate ($Mg(H_2PO_4)_2 \cdot 4H_2O$), meta phosphoric acid, also known as "phosphorous acid" ($H_3PO_3$), and magnesium phosphate ($Mg_3(PO_4)_2 \cdot 8H_2O$). As used herein the term "dominant phase" refers to any chemical compound that is present in the resin or cement composition, as the case may be, in an amount exceeding approximately 10% by weight of the resin composition, or cement composition, as the case may be, and is detectable by X-ray diffraction techniques. The first dominant phase, i.e., $Mg(H_2PO_4)_2 \cdot 4H_2O$, is distinctly different from commercially available similar material $Mg(H_2PO_4)_2 \cdot 2H_2O$ in its crystalline water content (four molecules versus two molecules). This additional crystalline water allows an easier dilution of the resin composition in water while producing cement as described in Example 2, below. Similarly, the second dominant phase, i.e., $H_3PO_3$ is meta phosphoric acid, which also helps in the formation of cement by acid-base reaction, as shown in Example 2, below. Finally the third dominant phase, i.e., $Mg_3(PO_4)_2 \cdot 8H_2O$ is a fully reacted phosphate that retains a significant amount of water, which is available during the formation of cement by acid-base reaction. Thus, the resin in this case retains large amount of water, even after it is dried into chunks. Even after two months of storage, there was no change in the resin properties. It was observed that resins such as the resin made in this example test tend to have excellent shelf life, i.e., when adequately stored in conventional sealed bags, they do not decompose or otherwise exhibit substantial changes in their physical or chemical properties for long periods of time, that is, for periods of time exceeding six months, or longer.

Example 2

Production of acid-base cement from resin pulp. This test demonstrates the ability of using a resin made by the methods described herein, and dissolving it in water in order to produce an acid-base cement. The process involves adding a small amount of MgO (or any other sparsely soluble oxide) as an activator to the resin. The resulting paste sets slowly into hardened cement ($MgHPO_4 \cdot 3H_2O$). The stoichiometry that governs the setting reaction is given by:

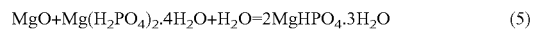

$$MgO+Mg(H_2PO_4)_2 \cdot 4H_2O+H_2O=2MgHPO_4 \cdot 3H_2O \quad (5)$$

Figure 2:
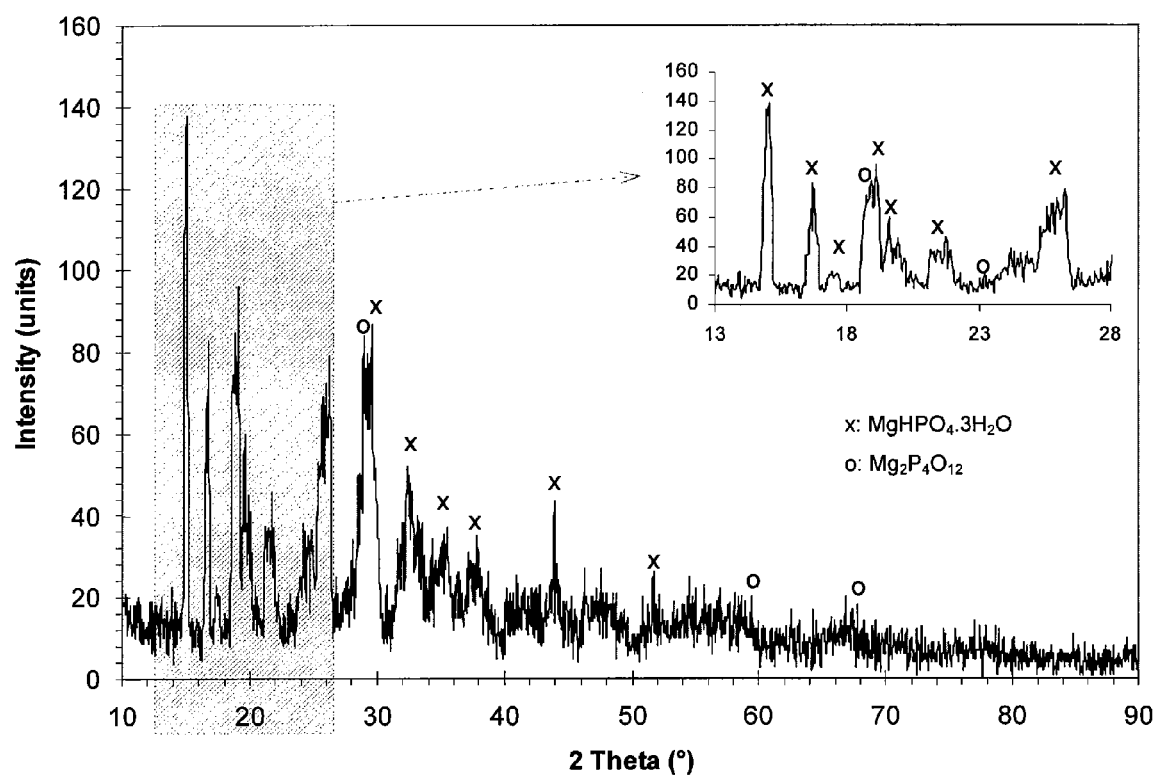
FIG. 2 is an X-ray diffraction pattern diagram illustrating the results of the X-ray diffraction studies reported in Example 2 below.

The technique of using the resin instead of powder of $Mg(H_2PO_4)_2 \cdot 2H_2O$ provides much more work time. In this test, 50 grams of resin were diluted in 16 ml of water to make a solution. To this solution were added 6 grams of MgO very slowly, i.e., for at least 30 minutes, so that the MgO powder was thoroughly mixed and no excessive amount of heat was generated. Mixing continued for an additional 15 minutes, and the paste was then allowed to cure. The paste heated in 5 minutes and set. FIG. 2 shows the X-ray diffraction output of the resulting cement. The dominant phases are $MgHPO_4 \cdot 3H_2O$ and $Mg_2(PO_3)_4$. The first dominant phase is formed by the chemical reaction represented by Reaction 5, above. The unexpected second dominant phase, i.e., $Mg_2(PO_3)_4$ (magnesium metaphosphate), is made by reacting the resin with MgO. This dominant phase is formed by the direct reaction of meta-phosphoric acid, which is a component in the resin described in Example 1, and additional magnesium oxide added during the formation of cement in this Example. Thus magnesium metaphosphate-containing cement is manufactured from resin pulp in this test. One advantage of these resins is that they go beyond production of ortho-phosphate phases, and may also produce meta-phase phosphate binders.

Example 3

Figure 3:
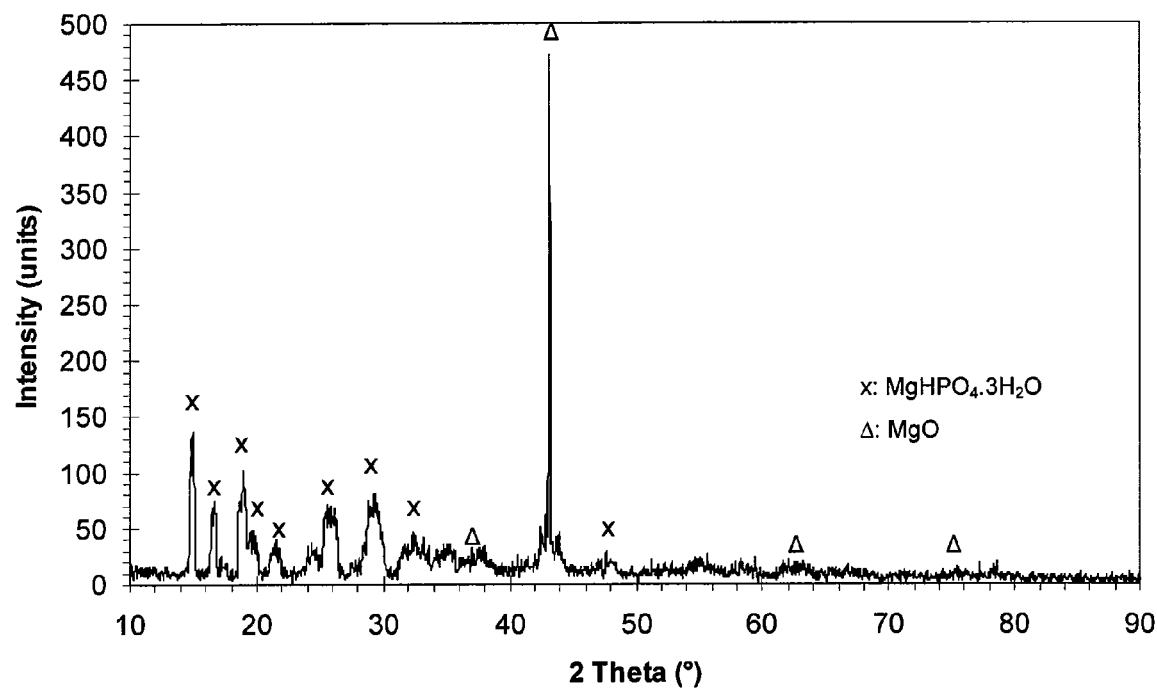
FIG. 3 is an X-ray diffraction pattern diagram illustrating the results of the X-ray diffraction studies reported in Example 3.

Production of resin partially activated with MgO. The test in Example 2 shows that set cement is formed when the stoichiometric amount of MgO is added. The test in Example 3 demonstrates the ability to produce a partially activated storable resin which, when heat-treated, results in solid cement. The test began with a solution of magnesium dihydrogen phosphate resin. While mixing continuously, MgO was added slowly, i.e., for at least 30 minutes, so that all of it became wet and reacted. Only 20% of the MgO was held back, and it was found that the paste was still thin. The paste was then dried and could be stored. However, instead of storing it, the paste was further dried at 50° C. and then continued to be heated. The result was set cement. This means that it is possible to produce cement with sub-stoichiometric amount of MgO and with some heat treatment. FIG. 3 shows that the only significant phases found in set cement are newberyite and excess MgO. Interestingly, significant amounts of MgO remained unreacted. It is likely that with the low pH of the paste, the sub-stoichiometric amounts of MgO reacted too fast and formed a cover of newberyite on each MgO particle, which then trapped the core of the MgO and protected it from further reaction. This may explain why in conventional methods, where slow dosing of MgO is not used, exactly the same phases tend to result. The excess MgO in such cases increases the temperature, which in turn accelerates the reaction, leaving little time for all of the MgO to react.

Example 4

Use of fly ash as an activator to form cement. Class C fly ash is an excellent byproduct of coal-fired power plants. It has been used to enhance strength of phosphate cements by Wagh and coworkers (see *Chemically Bonded Phosphate Ceramics*, Elsevier pub., 2004). In this test 500 grams of resin were dissolved in 63 ml of water, and 150 grams of Class C fly ash were added slowly, i.e., for at least 30 minutes, in the solution while mixing continued. While adding ash, only a small dose of ash was added each time so that every ash particle could wet properly. 2.5 grams of boric acid were also added to slow down the reaction. After mixing for 15 minutes, the paste started heating and set very rapidly, i.e., in about 10 minutes. The calcium oxide in the ash activates the resin, causing the formation of the cement. This shows the ability to use mineral or industrial waste streams rich in suitable oxides to produce products from resin. Additional activating oxide is not needed in these cases.

Example 5

Figure 4:
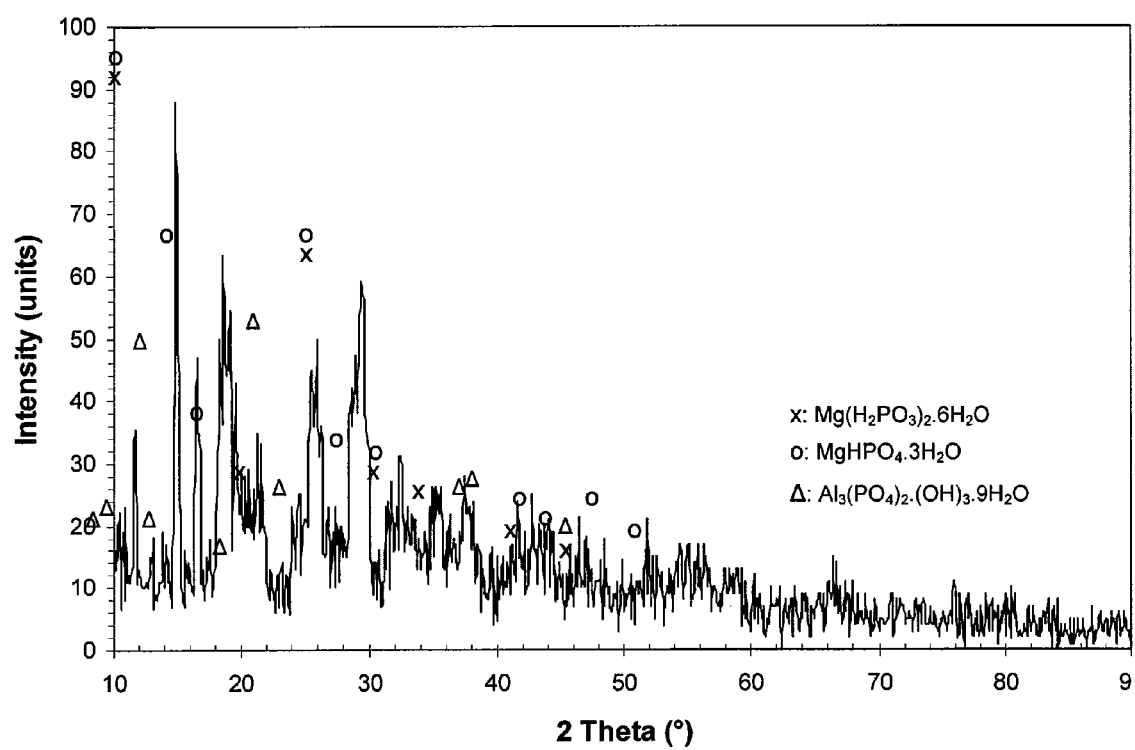
FIG. 4 is an X-ray diffraction pattern diagram illustrating the results of the X-ray diffraction studies reported in Example 5 below.

Use of alumina and wollastonite as simulators of fly ash. In the test of this example, ash was replaced by a combination of aluminum oxide or hydroxide and wollastonite ($CaSiO_3$). From a typical composition of ash, it was determined that 160 grams of aluminum hydroxide ($Al(OH)_3$) and 80 grams of wollastonite ($CaSiO_3$) represent 240 grams of class C ash. The amount of pulp, water and boric acid used in this case were 800 grams, 90 ml and 4 grams, respectively. Boric acid is used as a reaction retardant so that the ensuing reaction does not proceed too rapidly. Note that calcium oxide is also a major component of ash in Example 4, but it is the most reactive component in ash and therefore it was found that ash set rapidly in that Case. This rapid setting was avoided by eliminating calcium oxide. However, 96 grams of magnesium oxide had to be added to allow the acid-base reaction. All components were added slowly in small doses (it took 15 minutes to add the 96 grams of magnesium oxide), and the total mixing time was almost an hour. At the end, the paste was thick; and it was placed in molds. It took another half hour for the paste in the mold to set. The mixture of aluminum oxide and wollastonite serves three purposes in the formulation disclosed in this experiment, to wit, (a) as stated above, it replaces ash but avoids rapid reacting calcium oxide and gives user friendly cement; (b) in the event the composition has excess acid component or is deficient in magnesium oxide, the mixture of aluminum oxide and wollastonite provides the necessary alkaline component to neutralize the excess acid; and this ensures that the final product is neutral as desired; and (c) unlike ash product which is beige in color, the end product with aluminum oxide and wollastonite is white, and any color can be incorporated into it to produce objects of desired specific colors. As may be seen in FIG. 4, in this Case Study X-ray diffraction output showed the following three dominant phases: $Mg(H_2PO_3)_2 \cdot 6H_2O$, $MgHPO_4 \cdot 3H_2O$ and $Al_3(PO_4)_2 \cdot (OH)_3 \cdot 9H_2O$, Note that the first dominant phase evidences the formation of an unexpected meta-phosphate compound, $Mg(H_2PO_3)_2 \cdot 6H_2O$, similar to the one generated in Example 1, above. According to Reaction 5, the second phase (newberyite) is expected. However, the first phase ($Mg(H_2PO_3)_2 \cdot 6H_2O$) is in an unexpected reduced phosphorus state (phosphite, i.e., $PO_3$), resulting from the reduction of $PO_4$. Its formation is given by the generic reaction:

$$H_3PO_4 + H_2O \rightarrow H_3PO_3^{2+} + 2(OH)^- \quad (6)$$

The $OH^-$ ion reacts with alumina and forms the last phase. In addition, there exist amorphous phases that are formed by silica from calcium silicate. However, silica phases are amorphous and hence are not transparent to X-rays and it is difficult to identify them using XRD. As in earlier cases, the product formed in this case was very dense and hard, indicating excellent cement may be produced using alumina and calcium silicate.

Example 6

Development of fiber composites. The synthetic resin is also very useful for producing fiber reinforced composites. In this Example several compositions were tested using E-glass fiber and its mats. The general composition of the resin and its paste was the same as that given in Example 4. Detailed compositions of E-glass composites and their corresponding properties are given in Table 2. In each case, the resin was dissolved in water, and a paste of milk-like consistency was produced. The paste was then painted on the E-glass fabric and the wet fabric was folded in several layers and small weight (one psi) was put on it. The sample was hard by the next day. It was then heat-cured to remove all the moisture from it. Each sample set into a hard composite. The compositions contained 800 grams of resin solution, 160 grams of alumina, 80 grams of wollastonite, 4 grams of boric acid and 4 grams of color. Fiber glass was provided by PPG Industries, and the numbers identifying the mat are those commonly used in the fiberglass industry.

TABLE 2

| Fiberglass Mat Used | # of mat layers | MgO | Density (g/cm$^3$) | Flexural strength (psi) | Notes |
|---|---|---|---|---|---|
| CS Mat, 1.5 oz. | 4 | 96 | 1.2 | 1849 | Strong; Product was not uniform, difficult to spread |
| Open Fiber (scrim) | 2 | 90 | 1.24 | 549 | Poor strength |
| 5epix; 5ppi-G37, Open weave mat | 4 | 96 | 0.99 | 1024 | Good product, open-weave mat makes pouring sample easy |
| CS Mat, 1.5 oz., Well knit mat | 4 | 96 | 1.64 | 3999 | Strong; Mat was not soaked in water; Sample was relatively easy to pour with two people |

All powders and pulp are in grams and water in milliliters
Flexural strengths are average of three samples in each case.

Figure 5:
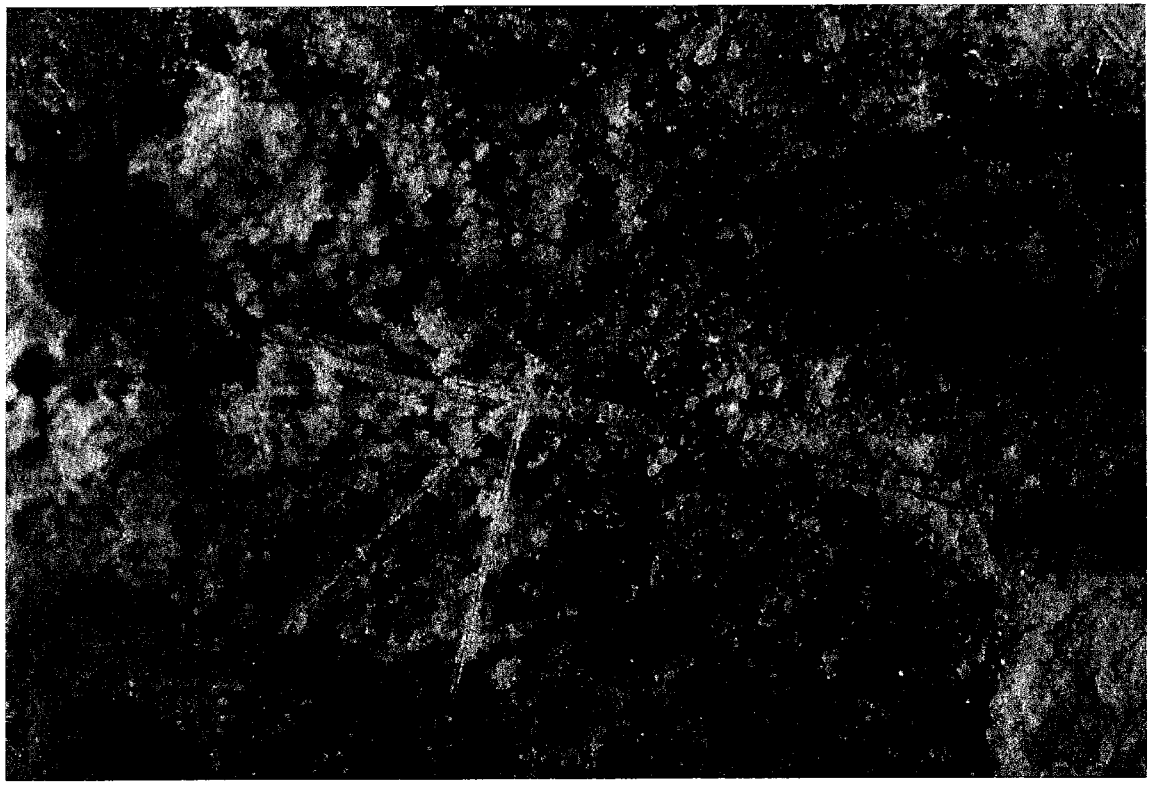
FIG. 5 depicts an optical micrograph of the fiber reinforced composite made with E-glass and an inorganic phosphate resin as discussed in Example 6 below.

The compositions and the observations presented in Table 2 show how a very high-strength composite may be produced with many synthetic resin embodiments of this invention. Note that the flexural strength of the fourth sample exceeds the strength of most composites cited in the industry literature. For example, Wagh reported maximum flexural strength of 1600 psi for glass fiber composites using magnesium potassium phosphate cement (see *Chemically Bonded Phosphate Ceramics*, Elsevier pub., 2004). Conventional cement has a flexural strength of 700 psi. The strength attained with phosphate resin exceeds by five times that of conventional cement. It is surmised that there are several reasons for this high strength. First, dilute resin solution allows high loading of fiber. In the current example, dilute paste was painted on fabric, which gave an estimated 25% fiber loading by weight, as against a maximum of 3% as reported by Wagh in earlier phosphate cements. Second, the resin is more acidic as compared to previous phosphate cements. For example, mono potassium phosphate used to form Ceramicrete has a pH of 4.2. In the current case, the resin has a pH of 2.6. A more acidic resin etches the fiber surface, and bonding between the fiber and the matrix is chemical as well as physical. In earlier cases, it was only physical. Third, a dilute paste of resin also wets the fiber much better than in earlier methods using powders. As a result, more surface area of the fiber is bonded. When failure occurs, one does not encounter fiber pull out, which is an indication of poor binding between the fiber and the matrix. Scanning electron microscopy of samples made with earlier methods showed that the bonding was not continuous, while in this case bonding is expected to be continuous along the length of fibers. FIG. 5 depicts an optical micrograph of the fiber reinforced composite made with E-glass and the inorganic phosphate resin. Note the intimate bond between the fiber and the matrix, which gave the sample an excellent flexural strength of 4,000-psi. The strength reported on the fourth row in Table 1 is approximately half of that reported on the final row. This is because the fiber mat used in the fourth row test was that of open weave, while in the fifth row test it was continuously knit mat. The results shown on the third row illustrate that sub-stoichiometric amount of magnesium oxide results in poorer strength. Finally, the results of the first row show that adequate amount of dilution of resin is required; otherwise, spreading of resin in the composite can be difficult. Overall, the density of phosphate resin and E-glass fiber is very low, which makes the composite product light-weight, yet very high in strength.

Example 7

Fire protection coatings and fire resistant wood composites. To demonstrate the ability of phosphate resin to produce fire protection material, 300 grams on magnesium dihydrogen phosphate were dissolved in 200 grams of water. The slurry was stirred continuously until a saturated solution had formed. Some phosphate remained undissolved in the water and the pH of the solution was 4.2. The paste was a thin resin at this point. A mixture of 100 grams of magnesium oxide and 600 grams of Class C fly ash was then added to this thin resin. The thick paste formed after mixing for 20 minutes could be sprayed with a spray gun. The thick paste was sprayed on a piece of rectangular ¾" AC Fir plywood to a thickness of 4 mils. To this sprayed plywood was added another coat of similar composition, except that fly ash was replaced with wollastonite ($CaSiO_3$), which imparted a white color to the surface. The thickness of this second coat was 2 mils. The sample was then cured (allowed to dry under ambient conditions) for 21 days. The cured sample was subsequently tested for fire rating. The fire rating test method used was as for the radiant heat (flame spread) test was ASTM E162. The sample was placed at an angle in front of the window of a hydrocarbon furnace as described in the procedure required by UL 1709. A small flame was in contact at the top side of the coated surface. The criterion was to determine the time for the flame to reach to the bottom of the rectangular plywood sample in the presence of the radiant heat and rate it accordingly. The time limit for the test was 20 minutes. In those 20 minutes, the flame did not spread, but only produced a small charred surface where it had contact with the sample surface. Thus, zero flame spread was observed. The rating given to the sample by this test was A, which is the highest rating for such tests.

Example 8

Ceramic from Aluminum Phosphate

A 50% dilute solution of phosphoric acid was mixed with aluminum oxide in the weight ratio of 5:16 to produce a resin in accordance with the method of the invention. The mixture was very dilute and had to be mixed for at least three hours so that some of aluminum oxide dissolved in the acid and formed a low-viscosity resin. Since the solubility of aluminum oxide in the acid solution is very low, it was clear that there was excess unreacted aluminum oxide in the resin. This resin was then poured into mild steel rectangular bar molds having dimensions of 1 inch×1 inch×6 inches. The molds were lined with parchment paper to avoid any reaction between the metal and the acid. These molds were kept at warm temperature of 85° F. for one full day, and excess water from the resin was evaporated. The dried resin now formed solid bars that were not very hard. The bars were then kept in an oven and were maintained at 450° F. for approximately four hours. The oven was cooled and the bars were removed. This treatment resulted in ceramic bars that were very homogeneous in consistency and extremely strong. They could not be broken with any physical force. Detailed study showed that these bars consisted of two phases: excess unreacted aluminum oxide ($Al_2O_3$) and a reaction binder phase of aluminum phosphate ($AlPO_4$) called berlinite. Normally ceramics are produced at very high temperatures, typically 1,500° F. or higher. This Example shows that, using the method of the invention, it is possible to produce a resin from trivalent oxides and then use the resin to manufacture ceramics at comparatively very low temperature.

Another embodiment of the invention ("Embodiment A") is a method for making a synthetic inorganic resin comprising the steps of (a) forming a low-pH aqueous solution of phosphoric acid; (b) mixing a sparsely-soluble oxide, or sparsely-soluble oxide mineral, with said aqueous solution of phosphoric acid, said sparsely-soluble oxide, or sparsely-soluble oxide mineral, added to said aqueous solution of phosphoric acid in an amount between about 40% molar and about 90% molar of the stoichiometric amount required to react with said aqueous solution of phosphoric acid; and (c) drying the mixture to form a synthetic inorganic resin having a pH higher than about 2.5. A modification of Embodiment A is mixing the oxide or oxide mineral while substantially continuously stirring and/or agitating to form a mixture and allowing the pH of the formed mixture to increase to at least about 2.5 but not more than about 6.0 while maintaining the temperature of said mixture during said substantially continuous stirring and/or agitating below about 90° F.

Another embodiment ("Embodiment B") is an inorganic, phosphate-based, synthetic resin having a pH of at least about 2.5, but not more than about 6.0, and comprising the chemical formula $A(H_2PO_4)_m \cdot nH_2O$, where "A" is an m-valent element, "m" is between 2 and 4, and "n", the number of moles of water of crystallization, is between 2 and 25. This chemical formula has an oxide or oxide mineral content and a phosphoric acid content. The phosphoric acid content is between about 2 and about 25 times, by weight, that of the oxide or oxide mineral content of the chemical formula. A modification of Embodiment B is a resin having an amorphous consistency resulting from having a viscosity of between about 15,000 and about 40,000 centipoises. In a further modification, Embodiment B has a shelf life of at least about 30 days.

While the present invention has been described herein in terms of particular embodiments and applications, in both summarized and detailed forms, it is not intended that any of these descriptions in any way should limit its scope to any such embodiments and applications; and it will be understood that substitutions, changes and variations in the described embodiments, applications and details of the method and the formulations disclosed herein can be made by those skilled in the art without departing from the spirit of this invention. Where the article "a" is used in the following claims, it is intended to mean "at least one" unless clearly indicated otherwise.

I claim:

1. A method for making a synthetic inorganic resin, comprising:
   (a) forming a low-pH aqueous solution of phosphoric acid;
   (b) mixing a sparsely-soluble oxide, or sparsely-soluble oxide mineral, with said aqueous solution of phosphoric acid, while substantially continuously stirring and/or agitating to form a mixture and allow the pH of the formed mixture to increase to at least about 2.5 but not more than about 6.0 while maintaining the temperature of said mixture during said substantially continuous stirring and/or agitating below about 90° F., said sparsely-soluble oxide, or sparsely-soluble oxide mineral, added to said aqueous solution of phosphoric acid in an amount between about 40% molar and about 90% molar of the stoichiometric amount required to react with said aqueous solution of phosphoric acid; wherein said sparsely-soluble oxide or sparsely-soluble oxide mineral is selected from the group consisting of CaO, MgO, ZnO, MnO, FeO, CoO, $Al_2O_3$, $La_2O_3$, $Y_2O_3$, $SrO_2$, $TiO_2$, $ZrO_2$, $CaSiO_3$, $MgSiO_3$, $Fe_3O_4$ and fly ash; and
   (c) drying the formed mixture to form a synthetic inorganic resin having a pH higher than about 2.5.

2. The method of claim 1, wherein said low-pH aqueous solution of phosphoric acid has a phosphate strength of between about 33% and about 79% $H_3PO_4$ by weight and a pH lower than about 0.5.

3. The method of claim 1, wherein said low-pH aqueous solution of phosphoric acid is made by dissolving a phosphate salt selected from the group consisting of sodium dihydrogen phosphate, magnesium dihydrogen phosphate and aluminum dihydrogen phosphate in an aqueous medium.

4. The method of claim 1, wherein said sparsely-soluble oxide, or sparsely-soluble oxide mineral, mixed with said aqueous solution of phosphoric acid is added in powder form.

5. The method of claim 1, wherein said synthetic inorganic resin product has a pH between about 3.0 and about 5.0.

6. The method of claim 1, wherein said sparsely-soluble oxide, or sparsely-soluble oxide mineral, mixed with said aqueous solution of phosphoric acid is a sparsely-soluble oxide selected from the group consisting of CaO, MgO, ZnO, MnO, FeO, CoO, $Al_2O_3$, $La_2O_3$ and $Y_2O_3$.

7. The method of claim 1, wherein said sparsely-soluble oxide, or sparsely-soluble oxide mineral, mixed with said aqueous solution of phosphoric acid is a sparsely-soluble oxide selected from the group consisting of $SrO_2$, $TiO_2$ and $ZrO_2$.

8. The method of claim 1, wherein said sparsely-soluble oxide, or sparsely-soluble oxide mineral, mixed with said aqueous solution of phosphoric acid is a sparsely-soluble oxide mineral selected from the group consisting of $CaSiO_3$, $MgSiO_3$ and $Fe_3O_4$.

9. The method of claim 1, wherein said sparsely-soluble oxide, or sparsely-soluble oxide mineral, mixed with said aqueous solution of phosphoric acid is fly ash.

10. The method of claim 1, wherein said substantially continuous stirring and/or agitating of the mixture in step (b) is carried out for at least about 30 minutes.

11. The method of claim 1, wherein said substantially continuous stirring and/or agitating of the mixture in step (b) is carried out by means of at least one sonic mixer, and the temperature of said mixture is maintained below about 90° F. by cooling the mixture using external means.

12. The method of claim 1, wherein said substantially continuous stirring and/or agitating of the mixture in step (b) is carried out by means of at least one sonic mixer, and the temperature of said mixture is maintained below about 90° F. by intermittently turning said at least one sonic mixer on and off in response to the fluctuations of said temperature as the mixing proceeds.

13. The method of claim 1, wherein said synthetic inorganic resin product has the chemical formula $A(H_2PO_4)_m \cdot nH_2O$, where "A" is an m-valent element, "m" is between 2 and 4, and "n", the number of moles of water of crystallization, is between 2 and 25.

14. The method of claim 1, wherein said synthetic inorganic resin product has the chemical formula $AH_3(PO_4)_2 \cdot nH_2O$, where "A" is a trivalent element and "n", the number of moles of water of crystallization, is between 0 and 25.

15. The method of claim 1, wherein said synthetic inorganic resin product has the chemical formula $A(OH)_2(H_2PO_4)_2 \cdot nH_2O$, where "A" is a quadrivalent element and "n", the number of moles of water of crystallization, is between 0 and 25.

16. A method for making a high-strength cement comprising:
   (a) forming a low-pH aqueous solution of phosphoric acid;
   (b) mixing a sparsely-soluble oxide, or sparsely-soluble oxide mineral, with said aqueous solution of phosphoric acid, while substantially continuously stirring and/or agitating to form a mixture and allow the pH of the formed mixture to increase to at least about 2.5 but not more than about 6.0 while maintaining the temperature of said mixture during said substantially continuous stirring and/or agitating below about 90° F., said sparsely-soluble oxide, or sparsely-soluble oxide mineral, added to said aqueous solution of phosphoric acid in an amount between about 40% molar and about 90% molar of the stoichiometric amount required to react with said aqueous solution of phosphoric acid;
   (c) drying the formed mixture to form a synthetic inorganic resin having a pH higher than about 2.5;
   (d) mixing said synthetic inorganic resin with water to produce a first paste;
   (e) adding a sparsely-soluble oxide, or sparsely-soluble oxide mineral, to said first paste; and
   (f) mixing said sparsely-soluble oxide, or sparsely-soluble oxide mineral, with said first paste, while continuously stirring, to form a thick second paste and allow the pH of the formed thick second paste to increase to at least about 7.0 but not more than about 9.0, thereby making a high-strength cement.

17. The method of claim 16, wherein said low-pH aqueous solution of phosphoric acid has a phosphate strength of between about 33% and 79% $H_3PO_4$ by weight and a pH lower than about 0.5.

18. The method of claim 16, wherein said low-pH aqueous solution of phosphoric acid is made by dissolving a phosphate salt selected from the group consisting of sodium dihydrogen phosphate, magnesium dihydrogen phosphate and aluminum dihydrogen phosphate in an aqueous medium.

19. The method of claim 16, wherein said sparsely-soluble oxide, or sparsely-soluble oxide mineral, is added in powder form.

20. The method of claim 16, wherein said synthetic inorganic resin formed in step (c) has a pH between about 3.0 and about 5.0.

21. The method of claim 16, wherein said sparsely-soluble oxide, or sparsely-soluble oxide mineral, mixed with said aqueous solution of phosphoric acid in step (b) is a sparsely-soluble oxide selected from the group consisting of CaO, MgO, ZnO, MnO, FeO, CoO, $Al_2O_3$, $La_2O_3$ and $Y_2O_3$.

22. The method of claim 16, wherein said sparsely-soluble oxide, or sparsely-soluble oxide mineral, mixed with said aqueous solution of phosphoric acid in step (b) is a sparsely-soluble oxide selected from the group consisting of $SrO_2$, $TiO_2$ and $ZrO_2$.

23. The method of claim 16, wherein said sparsely-soluble oxide, or sparsely-soluble oxide mineral, mixed with said aqueous solution of phosphoric acid in step (b) is a sparsely-soluble oxide mineral selected from the group consisting of $CaSiO_3$, $MgSiO_3$ and $Fe_3O_4$.

24. The method of claim 16, wherein said sparsely-soluble oxide, or sparsely-soluble oxide mineral, mixed with said aqueous solution of phosphoric acid in step (b) is fly ash.

25. The method of claim 16, wherein said substantially continuous stirring and/or agitating of the mixture in step (b) is carried out for at least about 30 minutes.

26. The method of claim 16, wherein said substantially continuous stirring and/or agitating of the mixture in step (b) is carried out by means of at least one sonic mixer, and the temperature of said mixture is maintained below about 90° F. by cooling the mixture using external means.

27. The method of claim 16, wherein said substantially continuous stirring and/or agitating of the mixture in step (b) is carried out by means of at least one sonic mixer, and the temperature of said mixture is maintained below about 90° F. by intermittently turning said at least one sonic mixer on and off in response to the fluctuations of said temperature as the mixing proceeds.

28. The method of claim 16, wherein said synthetic inorganic resin formed in step (c) has the chemical formula $A(H_2PO_4)_m \cdot nH_2O$, where "A" is an m-valent element, "m" is between 2 and 4, and "n", the number of moles of water of crystallization, is between 2 and 25, and wherein said high-strength cement product made in step (f) has the chemical formula $mA(HPO_4)_m \cdot 1.5mH_2O$, where "A" is an m-valent element and "1.5m" is the number of moles of water of crystallization.

29. The method of claim 16, wherein said synthetic inorganic resin formed in step (c) has the chemical formula $AH_3(PO_4)_2 \cdot nH_2O$, where "A" is a trivalent element and "n", the number of moles of water of crystallization, is between 0 and 25, and wherein said high-strength cement product made in step (f) has the chemical formula $mA(HPO_4)_m \cdot 1.5mH_2O$, where "A" is an m-valent element and "1.5m" is the number of moles of water of crystallization.

30. The method of claim 16, wherein said synthetic inorganic resin formed in step (c) has the chemical formula $A(OH)_2(H_2PO_4)_2 \cdot nH_2O$, where "A" is a quadrivalent element and "n", the number of moles of water of crystallization, is between 0 and 25, and wherein said high-strength cement product made in step (f) has the chemical formula $mA(HPO_4)_m \cdot 1.5mH_2O$, where "A" is an m-valent element and "1.5m" is the number of moles of water of crystallization.

31. The method of claim 16, wherein said sparsely-soluble oxide, or sparsely-soluble oxide mineral, mixed with said aqueous solution of phosphoric acid in step (b) and said sparsely-soluble oxide, or sparsely-soluble oxide mineral, added to said first paste in step (f) have different valences.

32. The method of claim 16, wherein said sparsely-soluble oxide, or sparsely-soluble oxide mineral, mixed with said aqueous solution of phosphoric acid in step (b) and said sparsely-soluble oxide, or sparsely-soluble oxide mineral, added to said first paste in step (f) have the same valence.

33. The method of claim 16, wherein said sparsely-soluble oxide, or sparsely-soluble oxide mineral, mixed with said aqueous solution of phosphoric acid in step (b) and said sparsely-soluble oxide, or sparsely-soluble oxide mineral, added to said first paste in step (f) are the same.

34. A method for making a high-strength ceramic product comprising:
  (a) forming a low-pH aqueous solution of phosphoric acid;
  (b) mixing a trivalent sparsely-soluble oxide, or trivalent sparsely-soluble oxide mineral, with said aqueous solution of phosphoric acid, while substantially continuously stirring and/or agitating to form a mixture and allow the pH of the formed mixture to increase to at least about 2.5 but not more than about 6.0 while maintaining the temperature of said mixture during said substantially continuous stirring and/or agitating below about 90° F., said trivalent sparsely-soluble oxide, or trivalent sparsely-soluble oxide mineral, added to said aqueous solution of phosphoric acid in an amount between about 40% molar and about 90% molar of the stoichiometric amount required to react with said aqueous solution of phosphoric acid;
  (c) drying the formed mixture to form a synthetic inorganic resin having a pH higher than about 2.5;
  (d) mixing said synthetic inorganic resin with water to produce a first paste;
  (e) adding a trivalent sparsely-soluble oxide, or trivalent sparsely-soluble oxide mineral, to said first paste;
  (f) mixing said trivalent sparsely-soluble oxide, or trivalent sparsely-soluble oxide mineral, with said first paste, while substantially continuously stirring, to form a thick second paste and allow the pH of the formed thick second paste to increase to at least about 7.0 but not more than about 9.0;
  (g) drying said formed thick second paste; and
  (h) heating said dried formed thick second paste to a temperature of between about 250° F. and about 500° F. for at least about one hour, thereby making a high-strength ceramic product.

35. A method for making a high-strength ceramic product comprising:
  (a) forming a low-pH aqueous solution of phosphoric acid;
  (b) mixing a quadrivalent sparsely-soluble oxide, or quadrivalent sparsely-soluble oxide mineral, with said aqueous solution of phosphoric acid, while substantially continuously stirring and/or agitating to form a mixture and allow the pH of the formed mixture to increase to at least about 2.5 but not more than about 6.0 while maintaining the temperature of said mixture during said substantially continuous stirring and/or agitating below about 90° F., said quadrivalent sparsely-soluble oxide, or quadrivalent sparsely-soluble oxide mineral, added to said aqueous solution of phosphoric acid in an amount between about 40% molar and about 90% molar of the stoichiometric amount required to react with said aqueous solution of phosphoric acid;

(c) drying the formed mixture to form a synthetic inorganic resin having a pH higher than about 2.5;
(d) mixing said synthetic inorganic resin with water to produce a first paste;
(e) adding a quadrivalent sparsely-soluble oxide, or quadrivalent sparsely-soluble oxide mineral, to said first paste;
(f) mixing said quadrivalent sparsely-soluble oxide, or quadrivalent sparsely-soluble oxide mineral, with said first paste, while substantially continuously stirring, to form a thick second paste and allow the pH of the formed thick second paste to increase to at least about 7.0 but not more than about 9.0;
(g) drying said formed thick second paste; and
(h) heating said dried formed thick second paste to a temperature of between about 400° F. and about 700° F. for at least about one hour, thereby making a high-strength ceramic product.

36. An inorganic, phosphate-based, synthetic resin having a pH of at least about 2.5, but not more than about 6.0, and the chemical formula $A(H_2PO_4)_m \cdot nH_2O$, where "A" is an m-valent element, "m" is between 2 and 4, and "n", the number of moles of water of crystallization, is between 2 and 25, said chemical formula having an oxide, or oxide mineral, content and a phosphoric acid content, said phosphoric acid content being between about 2 and about 25 times by weight that of the oxide, or oxide mineral, content of the chemical formula, said resin formed by mixing a low-pH aqueous solution of phosphoric acid with a sparsely-soluble oxide, or sparsely-soluble oxide mineral, while substantially continuously stirring and/or agitating, to form a mixture and allow the pH of the formed mixture to increase to at least about 2.5 but not more than about 6.0 while maintaining the temperature of said mixture during said substantially continuous stirring and/or agitating below about 90° F., and drying the formed mixture, said sparsely-soluble oxide, or sparsely-soluble oxide mineral, added to said aqueous solution of phosphoric acid in less than the stoichiometric amount required to react with said aqueous solution of phosphoric acid.

37. The inorganic, phosphate-based, synthetic resin of claim 36, wherein said low-pH aqueous solution of phosphoric acid has a phosphate strength of between about 33% and about 79% $H_3PO_4$ by weight and a pH lower than about 0.5.

38. The inorganic, phosphate-based, synthetic resin of claim 36, wherein said sparsely-soluble oxide, or sparsely-soluble oxide mineral, mixed with said aqueous solution of phosphoric acid is added in powder form.

39. The inorganic, phosphate-based, synthetic resin of claim 36, having a pH between about 3.0 and about 5.0.

40. The inorganic, phosphate-based, synthetic resin of claim 36, wherein said sparsely-soluble oxide, or sparsely-soluble oxide mineral, mixed with said aqueous solution of phosphoric acid is a sparsely-soluble oxide selected from the group consisting of CaO, MgO, ZnO, MnO, FeO, CoO, $Al_2O_3$, $La_2O_3$ and $Y_2O_3$.

41. The inorganic, phosphate-based, synthetic resin of claim 36, wherein said sparsely-soluble oxide, or sparsely-soluble oxide mineral, mixed with said aqueous solution of phosphoric acid is a sparsely-soluble oxide selected from the group consisting of $SrO_2$, $TiO_2$ and $ZrO_2$.

42. The inorganic, phosphate-based, synthetic resin of claim 36, wherein said sparsely-soluble oxide, or sparsely-soluble oxide mineral, mixed with said aqueous solution of phosphoric acid is a sparsely-soluble oxide mineral selected from the group consisting of $CaSiO_3$, $MgSiO_3$ and $Fe_3O_4$.

43. The inorganic, phosphate-based, synthetic resin of claim 36, wherein said sparsely-soluble oxide, or sparsely-soluble oxide mineral, mixed with said aqueous solution of phosphoric acid is fly ash.

44. The inorganic, phosphate-based, synthetic resin of claim 36, wherein said substantially continuous stirring and/or agitating of the mixture is carried out for at least about 30 minutes.

45. An inorganic, phosphate-based, synthetic resin having a pH of at least about 2.5, but not more than about 6.0, and the chemical formula $AH_3(PO_4)_2 \cdot nH_2O$, where "A" is a trivalent element and "n", the number of moles of water of crystallization, is between 0 and 25, said chemical formula having an oxide, or oxide mineral, content and a phosphoric acid content, said phosphoric acid content being between about 2 and about 25 times by weight that of the oxide, or oxide mineral, content of the chemical formula, said resin formed by mixing a low-pH aqueous solution of phosphoric acid with a sparsely-soluble oxide, or sparsely-soluble oxide mineral, while substantially continuously stirring and/or agitating, to form a mixture and allow the pH of the formed mixture to increase to at least about 2.5 but not more than about 6.0 while maintaining the temperature of said mixture during said substantially continuous stirring and/or agitating below about 90° F., and drying the formed mixture, said sparsely-soluble oxide, or sparsely-soluble oxide mineral, added to said aqueous solution of phosphoric acid in less than the stoichiometric amount required to react with said aqueous solution of phosphoric acid.

46. The inorganic, phosphate-based, synthetic resin of claim 45, wherein said low-pH aqueous solution of phosphoric acid has a phosphate strength of between about 33% and about 79% $H_3PO_4$ by weight and a pH lower than about 0.5.

47. The inorganic, phosphate-based, synthetic resin of claim 45, wherein said sparsely-soluble oxide, or sparsely-soluble oxide mineral, mixed with said aqueous solution of phosphoric acid is added in powder form.

48. The inorganic, phosphate-based, synthetic resin of claim 45, having a pH between about 3.0 and about 5.0.

49. The inorganic, phosphate-based, synthetic resin of claim 45, wherein said sparsely-soluble oxide, or sparsely-soluble oxide mineral, mixed with said aqueous solution of phosphoric acid is a sparsely-soluble oxide selected from the group consisting of CaO, MgO, ZnO, MnO, FeO, CoO, $Al_2O_3$, $La_2O_3$ and $Y_2O_3$.

50. The inorganic, phosphate-based, synthetic resin of claim 45, wherein said sparsely-soluble oxide, or sparsely-soluble oxide mineral, mixed with said aqueous solution of phosphoric acid is a sparsely-soluble oxide selected from the group consisting of $SrO_2$, $TiO_2$ and $ZrO_2$.

51. The inorganic, phosphate-based, synthetic resin of claim 45, wherein said sparsely-soluble oxide, or sparsely-soluble oxide mineral, mixed with said aqueous solution of phosphoric acid is a sparsely-soluble oxide mineral selected from the group consisting of $CaSiO_3$, $MgSiO_3$ and $Fe_3O_4$.

52. The inorganic, phosphate-based, synthetic resin of claim 45, wherein said sparsely-soluble oxide, or sparsely-soluble oxide mineral, mixed with said aqueous solution of phosphoric acid is fly ash.

53. The inorganic, phosphate-based, synthetic resin of claim 45, wherein said substantially continuous stirring and/or agitating of the mixture is carried out for at least about 30 minutes.

54. An inorganic, phosphate-based, synthetic resin having a pH of at least about 2.5, but not more than about 6.0, and the chemical formula $A(OH)_2(H_2PO_4)_2 \cdot nH_2O$, where "A" is a quadrivalent element and "n", the number of moles of water of crystallization, is between 0 and 25, said chemical formula having an oxide, or oxide mineral, content and a phosphoric acid content, said phosphoric acid content being between about 2 and about 25 times by weight that of the oxide, or oxide mineral, content of the chemical formula, said resin formed by mixing a low-pH aqueous solution of phosphoric acid with a sparsely-soluble oxide, or sparsely-soluble oxide mineral, while substantially continuously stirring and/or agitating, to form a mixture and allow the pH of the formed mixture to increase to at least about 2.5 but not more than about 6.0 while maintaining the temperature of said mixture during said substantially continuous stirring and/or agitating below about 90° F., and drying the formed mixture, said sparsely-soluble oxide, or sparsely-soluble oxide mineral, added to said aqueous solution of phosphoric acid in less than the stoichiometric amount required to react with said aqueous solution of phosphoric acid.

55. The inorganic, phosphate-based, synthetic resin of claim 54, wherein said low-pH aqueous solution of phosphoric acid has a phosphate strength of between about 33% and about 79% $H_3PO_4$ by weight and a pH lower than about 0.5.

56. The inorganic, phosphate-based, synthetic resin of claim 54, wherein said sparsely-soluble oxide, or sparsely-soluble oxide mineral, mixed with said aqueous solution of phosphoric acid is added in powder form.

57. The inorganic, phosphate-based, synthetic resin of claim 54, having a pH between about 3.0 and about 5.0.

58. The inorganic, phosphate-based, synthetic resin of claim 54, wherein said sparsely-soluble oxide, or sparsely-soluble oxide mineral, mixed with said aqueous solution of phosphoric acid is a sparsely-soluble oxide selected from the group consisting of CaO, MgO, ZnO, MnO, FeO, CoO, $Al_2O_3$, $La_2O_3$ and $Y_2O_3$.

59. The inorganic, phosphate-based, synthetic resin of claim 54, wherein said sparsely-soluble oxide, or sparsely-soluble oxide mineral, mixed with said aqueous solution of phosphoric acid is a sparsely-soluble oxide selected from the group consisting of $SrO_2$, $TiO_2$ and $ZrO_2$.

60. The inorganic, phosphate-based, synthetic resin of claim 54, wherein said sparsely-soluble oxide, or sparsely-soluble oxide mineral, mixed with said aqueous solution of phosphoric acid is a sparsely-soluble oxide mineral selected from the group consisting of $CaSiO_3$, $MgSiO_3$ and $Fe_3O_4$.

61. The inorganic, phosphate-based, synthetic resin of claim 54, wherein said sparsely-soluble oxide, or sparsely-soluble oxide mineral, mixed with said aqueous solution of phosphoric acid is fly ash.

62. The inorganic, phosphate-based, synthetic resin of claim 54, wherein said substantially continuous stirring and/or agitating of the mixture is carried out for at least about 30 minutes.

63. An inorganic, phosphate-based, synthetic resin having a pH of at least about 2.5, but not more than about 6.0, and comprising the chemical formula $A(H_2PO_4)_m \cdot nH_2O$, where "A" is an m-valent element, "m" is between 2 and 4, and "n", the number of moles of water of crystallization, is between 2 and 25, said chemical formula having an oxide, or oxide mineral, content and a phosphoric acid content, said phosphoric acid content being between about 2 and about 25 times by weight that of the oxide, or oxide mineral, content of the chemical formula, said resin having an amorphous consistency of between about 15,000 and about 40,000 centipoises and a shelf life of at least about 30 days.

64. The inorganic, phosphate-based, synthetic resin of claim 63, wherein "A" is a divalent element selected from the group consisting of Ca, Mg, Zn, Mn, Fe and Co.

65. The inorganic, phosphate-based, synthetic resin of claim 63, wherein "A" is a trivalent element selected from the group consisting of Al, La, Bi and Y, and "n" is between 2 and 10.

66. The inorganic phosphate resin of claim 63, wherein "A" is a quadrivalent element selected from the group consisting of Sr, Ti and Zr, and "n" is between 2 and 10.

67. An inorganic, phosphate-based, synthetic resin having a pH of at least about 2.5, but not more than about 6.0, and comprising the chemical formula $AH_3(PO_4)_2 \cdot nH_2O$, where "A" is a trivalent element and "n", the number of moles of water of crystallization, is between 0 and 25, said chemical formula having an oxide, or oxide mineral, content and a phosphoric acid content, said phosphoric acid content being between about 2 and about 25 times by weight that of the oxide, or oxide mineral, content of the chemical formula, said resin having an amorphous consistency of between about 15,000 and about 40,000 centipoises and a shelf life of at least about 30 days.

68. The inorganic, phosphate-based, synthetic resin of claim 67, wherein "A" is selected from the group consisting of Al, La and Y, and "n" is between 2 and 10.

69. An inorganic, phosphate-based, synthetic resin having a pH of at least about 2.5, but not more than about 6.0, and comprising the chemical formula $A(OH)_2(H_2PO_4)_2 \cdot nH_2O$, where "A" is a quadrivalent element and "n", the number of moles of water of crystallization, is between 0 and 25, said chemical formula having an oxide, or oxide mineral, content and a phosphoric acid content, said phosphoric acid content being between about 2 and about 25 times by weight that of the oxide, or oxide mineral, content of the chemical formula, said resin having an amorphous consistency of between about 15,000 and about 40,000 centipoises and a shelf life of at least about 30 days.

70. The inorganic, phosphate-based, synthetic resin of claim 69, wherein "A" is selected from the group consisting of Sr, Ti and Zr, and "n" is between 2 and 10.

\* \* \* \* \*